United States Patent
Mohapatra

(10) Patent No.: US 10,706,160 B1
(45) Date of Patent: Jul. 7, 2020

(54) METHODS, SYSTEMS, AND ARTICLES OF MANUFACTURE FOR PROTECTING DATA IN AN ELECTRONIC DOCUMENT USING STEGANOGRAPHY TECHNIQUES

(71) Applicant: INTUIT INC., Mountain View, CA (US)

(72) Inventor: Deepankar Mohapatra, The Colony, TX (US)

(73) Assignee: INTUIT INC., Mountain View, CA (US)

(*) Notice: Subject to any disclaimer, the term of this patent is extended or adjusted under 35 U.S.C. 154(b) by 188 days.

(21) Appl. No.: 15/687,143

(22) Filed: Aug. 25, 2017

(51) Int. Cl.
*G06F 21/60* (2013.01)
*G06F 21/62* (2013.01)

(52) U.S. Cl.
CPC ........ *G06F 21/602* (2013.01); *G06F 21/6245* (2013.01)

(58) Field of Classification Search
CPC .................. G06F 21/602; G06F 21/6245
See application file for complete search history.

(56) References Cited

U.S. PATENT DOCUMENTS

| | | | |
|---|---|---|---|
| 5,613,004 A | 3/1997 | Cooperman et al. | |
| 7,657,759 B2* | 2/2010 | Rubin | G06F 17/211 345/551 |
| 2005/0259289 A1* | 11/2005 | Ferlitsch | G06F 21/608 358/1.14 |
| 2007/0047008 A1* | 3/2007 | Graham | G06K 9/325 358/401 |
| 2009/0313245 A1* | 12/2009 | Weyl | G06K 9/00463 |
| 2009/0327144 A1* | 12/2009 | Hatter | G06Q 20/02 705/75 |
| 2010/0317420 A1* | 12/2010 | Hoffberg | G06Q 30/0207 463/1 |
| 2011/0019816 A1* | 1/2011 | Inami | G06F 21/608 380/28 |
| 2011/0055585 A1* | 3/2011 | Lee | H04L 9/0844 713/183 |
| 2013/0102372 A1* | 4/2013 | Lutnick | G07F 17/3293 463/13 |

OTHER PUBLICATIONS http://wbstego.wbailer.com/, Mar. 1, 2004 (3pages).
http://research.ijcaonline.org/ctngc/number3/ctngc1031.pdf, National Conference on Communication Technologies & its impact on Next Generation Computing CTNGC 2012, printed: Aug. 25, 2017 (5pages).
http://lifehacker.com/230915/geek-to-live--hide-data-in-files-with-easy-steganography-tools, printed: Aug. 25, 2017 (5pages).

(Continued)

*Primary Examiner* — Techane Gergiso
(74) *Attorney, Agent, or Firm* — DLA Piper LLP (US)

(57) ABSTRACT

Various aspects described herein are directed to methods and systems that preprocess an electronic document or some data therein and conceal sensitive data in the electronic document by applying steganography to the data associated with one or more fonts. A steganography map is generated or updated to include steganography information about applying steganography to the data. Cryptography may be applied to the steganography map; and the electronic document may be transformed into a different document format.

27 Claims, 15 Drawing Sheets

(56) References Cited

OTHER PUBLICATIONS https://www.ijarcsse.com/docs/papers/April2012/Volume_2_issue_4/V2I400162.pdf, Apr. 2012, (6pages).

http://www.ijcaonline.org/proceedings/ctngc/number3/9067-1031?format=pdf, JCA Proceedings on National Conference on Communication Technologies & its impact on Next Generation Computing 2012, printed: Aug. 25, 2017 (3pages).

https://www.ripublication.com/irph/ijict_spl/ijictv4n5spl_02.pdf, ISSN 0974-2239 vol. 4, No. 5 (2014), pp. 453-458, printed: Aug. 25, 2017.

https://www.researchgate.net/profile/Ako_Abdullah/publication/304066315_New_Approaches_to_Encrypt_and_Decrypt_Data_in_Image_using_Cryptography_and_Steganography_Algorithm/links/5769163308aed2126c3fdc53/New-Approaches-to-Encrypt-and-Decrypt-Data-in-Image-using-Cryptography-and-Steganography-Algorithm.pdf, Jun. 2016 (8pages).

https://pdfs.semanticscholar.org/ee43/c3be857f2b04c46b46ad3edfb3adecc62484.pdf, IJCSNS International Journal of Computer Science and Network Security, vol. 8, No. 6, Jun. 2008, pp. 247-254.

http://blogs.adobe.com/security/2011/08/pdf-encryption-options.html, Aug. 4, 2011 (2pages).

https://www.os3.nl/_media/2012-2013/courses/ssn/using_steganography_to_hide_messages_inside_pdf_files.pdf, Dec. 30, 2012 (34pages).

http://www.adobe.com/content/dam/Adobe/en/devnet/acrobat/pdfs/pdf_reference_1-7.pdf, Nov. 2016; printed Aug. 25, 2017 (1310 pages).

\* cited by examiner

| Data ID | Field ID | Char. ID | Original Loc | Sc. Loc | Illegal Value | Form/File ID |
|---|---|---|---|---|---|---|
| SSN | 1 | 1 | (480, 680) | (275, 308) | 57 | 1040 |
| SSN | 1 | 2 | (480, 692) | (580, 96) | 48 | 1040 |
| SSN | 1 | 3 | (480, 704) | (322, 436) | 50 | 1040 |
| ... | ... | ... | ... | ... | ... | ... |

FIG. 3H

METHODS, SYSTEMS, AND ARTICLES OF MANUFACTURE FOR PROTECTING DATA IN AN ELECTRONIC DOCUMENT USING STEGANOGRAPHY TECHNIQUES

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

With the advent of computer network technologies, electronic documents, files, messages, or data have been transmitted among various networked computing systems of a plurality of different platforms (e.g., different operating systems, different browsers, different computer capabilities, etc.) for various purposes such as sharing or collaboration. Such electronic documents, files, messages, or data may include non-sensitive data. Oftentimes, such non-sensitive data may also include sensitive data that the owners or users may wish to prevent undesired or unauthorized access.

The increasing popularity of hosted software applications may require the transmission of sensitive data across various networks and thus exacerbates the risk of inadvertent, undesired, or unauthorized disclosure of such sensitive data.

Conventionally, users or owners may wish to encrypt such electronic documents, files, messages, or data. Nonetheless, an encrypted document by encoding the information (e.g., plaintext) in an electronic document into ciphertext by using an encrypting algorithm so that the information can only be revealed when the ciphertext is decrypted. Nonetheless, encryption alone generates an encrypted file that attracts attention and may thus be subject to various types of attacks in an attempt to illegally gain access to the information.

Therefore, there exists a need for a method, system, and computer product for protecting data in an electronic document, file, message, or data segment using steganography techniques to address at least the aforementioned challenges arising out of the generating and protection of electronic documents.

SUMMARY

Disclosed are various embodiments relating to methods, systems, and articles of manufacture for protecting data in an electronic document, form, file, message, or data segment (collectively an "electronic document" for singular or "electronic documents" for plural) using steganography techniques. These embodiments address the computer-centric problems and challenges of generation of electronic documents, protection of information therein, and transmission of protected information or data across computer networks, while reducing the possibility of perception and detection of protected data or information and hence reducing or eliminating the risks of inadvertent disclosure or unauthorized access to such protected data or information. One or more embodiments are directed at a method for protecting data in an electronic document, form, file, message, or data segment using steganography techniques for software applications including, for example, tax preparation software product or software service, financial management software product or software service, payroll software product or software service, accounting software product or software service, etc.

In these embodiments, at least one electronic document or at least some data in the at least one electronic document may be pre-processed; first data may be concealed within the at least one electronic document at least by applying steganography to the first data that is associated with one or more fonts; a steganography map may be generated or updated to include steganography information about applying steganography to the first data; cryptography may be applied to the steganography map; and the at least one electronic document may be transformed into a different document format.

In some embodiments, pre-processing the at least one electronic document or the at least some data therein may include determining whether the at least one electronic document has been pre-processed. When at least one electronic document is determined not to have been pre-processed, the at least one electronic document may be parsed to identify pre-existing data in the at least one electronic document; the pre-existing data and pertinent information or data may be stored; and the pre-existing data may be filtered out from further processing.

In some of these embodiments, one or more portions corresponding to or occupied by the pre-existing data may be identified in the electronic document; a mask or a filter may be applied to the one or more portions in the electronic document; and the mask or the filter may be stored. In addition or in the alternative, one or more properties of at least some data in the electronic document may be identified; the one or more properties of the at least some data may be transformed into one or more transformed properties; and the one or more properties, the one or more transformed properties, or one or more links between the one or more properties and the one or more transformed properties may be stored for restoring the first data to which the steganography has been applied.

In some embodiments, the first data may be identified from one or more screens of a software application, and identifying the first data may include identifying a pre-processed version of the electronic document. A filled version of the electronic document; and deltas between the pre-processed version and the filled version of the electronic document may be identified. In some of these embodiments, sensitivity values respectively corresponding to the deltas may be determined; and the first data may be identified based in part or in whole upon the sensitivity values.

In some embodiments, a first transformation may be performed on the first data or on first normalized data to generate first transformed data. In these embodiments, the first data may be reduced into first reduced data having a smaller size than a size of the first data; one or more attributes of the first reduced data may be identified; and a requirement for available space for the first reduced data may be reduced at least by normalizing the first reduced data with modifications to the one or more attributes.

In some of these embodiments, a pre-modification version and a post-modification version of the one or more attributes may be stored; one or more links between the pre-modification version and the post-modification version of the one or more attributes may be created and stored; and the first data may be transformed into the first transformed data.

In some embodiments, concealing the first data within the at least one electronic document may involve maintaining a width of a line including the first available space at least by modifying at least one character width of the line including the first available space. A location of the at least one segment, a pre-modification value of the at least one character width, and a post-modification value of the at least one character width may be stored.

In addition or in the alternative, an invalid or illegal first data for the first data may be created; the invalid or illegal first data may be placed in an original location of the first data in the electronic document; a flag may be associated with a display state of the invalid or illegal first data; and one or more warning messages may be transmitted when the flag is triggered to display the invalid or illegal first data. Optionally, the steganography may be applied to second data corresponding to the first data and pertaining to identity theft using the steganography map or a different steganography map.

In some embodiments, generating or updating a step map may include identifying information pertaining to applying the steganography to the first data. At least two entries of a first data identifier of the first data, a first field identifier of the first data, a first character identifier of a first segment of the first data, a first original location or a first reference to the first original location of the first segment of the first data, a first scrambled location or a first scrambled reference to the first scrambled location for concealing the first segment in the electronic document, a first invalid segment for the first segment of the first data, a first object identifier of the first data, and a first electronic document identifier of the electronic document may be identified; and the at least two entries may be stored into respective columns of the steganography map.

In some of these embodiments, the step map may be indexed with an index that is generated with one or more entries of the at least two entries in the steganography map.

Certain embodiments are directed at an apparatus for protecting data in an electronic document, form, file, message, or data segment using steganography techniques for software applications including, for example, for tax preparation software product or software service, financial management software product or software service, payroll software product or software service, accounting software product or software service, etc. More details about the apparatus for implementing various processes will be described in some of the subsequent paragraphs with reference to one or more drawing figures.

In these embodiments, the system may include memory storing thereupon a sequence of instructions and at least one microprocessor executing the sequence of instructions. The system may further include a plurality of steg modules which may include one or more modules of a transformation module, a parsing module, a map generation or update module, a plurality of artificial intelligence modules, an available space identification module, a normalization or de-normalization module, a masking or filtering module, one or more cryptography modules, and/or a coordinate system module.

Certain embodiments are directed at an article of manufacture having stored thereupon a sequence of instructions which, when executed by a mobile computing or communication device, causes the mobile computing or communication device to perform various processes or to invoke various modules described herein. More details about the article of manufacture will be described in some of the subsequent paragraphs with reference to one or more drawing figures. Some of the aforementioned embodiments are directed to various computer program products, mechanisms, and modules for software applications tax preparation software product or software service, financial management software product or software service, payroll software product or software service, accounting software product or software service, etc. Some other embodiments are directed to various computer program products and modules for financial management, to the extent that it is severable from any tax strategy or does not limit the use of any tax strategy by any taxpayer or tax advisor.

Further details of various embodiments of the invention are described in the Detailed Description section with reference to respective figures.

BRIEF DESCRIPTION OF THE FIGURES

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only certain embodiments and are not therefore to be considered limiting of its scope, certain embodiments will be described and explained with additional specificity and detail through the use of the accompanying drawings in which:

FIG. 3H illustrates a simplified example of a steganography map in one or more embodiments.

FIG. 3I illustrates a simplified example of a structure of an electronic document processed with the steg modules described herein in one or more embodiments.

DETAILED DESCRIPTION OF ILLUSTRATED EMBODIMENTS

Figure 1A:
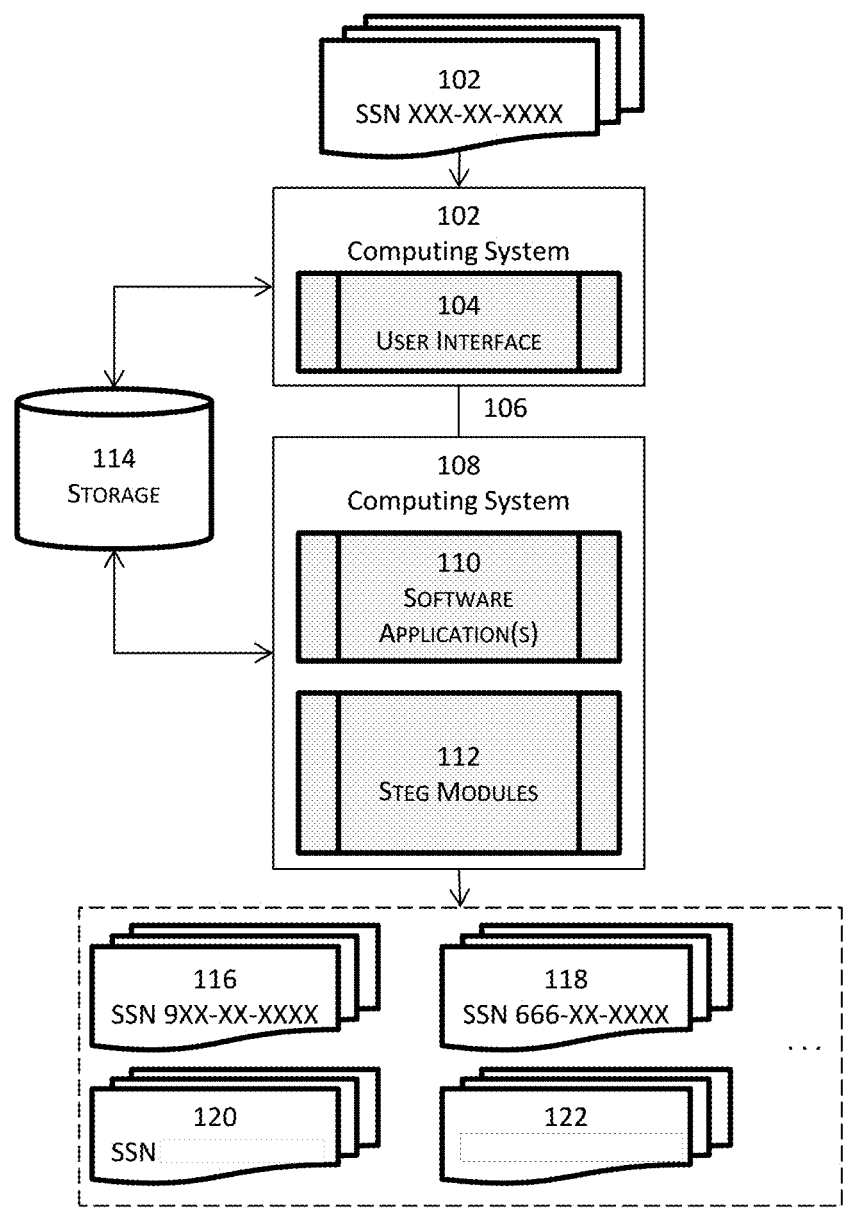
FIG. 1A illustrates a high level block diagram of a system for protecting data in an electronic document, form, file, message, or data segment using steganography techniques in one or more embodiments.

Some embodiments are directed at a method or system that protects data in an electronic document, form, file, message, or data segment using steganography techniques.

An electronic document described herein may preserve its original layout of a document as the author or publisher intends the document to appear and may be created via a proprietary software application product or service. An electronic document may also be editable with a software application product or service and may also allow scalable text with one or more fonts or font objects (e.g., a digital object of a description of a digital typeface corresponding to an encoding scheme such WinAnsi, MacRoman, etc.), image models (e.g., vector images, Bitmap images, raster images, etc.) with graphics transparency, interactive elements (e.g., interactive forms, etc.), semantic information, etc. to be combined in one document.

An electronic document may also include multiple pages having one or more of the aforementioned objects or models embedded therein and may save the actual text with the electronic document, rather than saving a rasterized version thereof. As a result, the text included in an electronic document described herein appears clean and sharp, regardless of how the electronic document or a page thereof is scaled. The same clean and sharp appearance also applies to vector images in an electronic document described herein because vector images in an electronic document are not represented in pixels. Rather, vector images are represented with a plurality of graphics states or parameters some of may be changed, configured, saved, and/or restored. An electronic document is thus distinguishable from digital images such as JPEG/JPG image files, BMP files (Bitmap image files), PNG (portable network graphics) files, TIFF image files, GIF image files, etc. that store lossless or lossy pixel-by-pixel representation of the image. These digital image files will appear blocky when scaled larger than their actual sizes.

One example of graphics states or parameters include a color space that includes an organization of colors and may be used in combination with physical device profiling to allow for reproducible representations of colors in analog and/or digital representations, Another example of graphics states or parameters includes a clipping path that is applied to generate a hard (aliased) or soft (anti-aliased) edge, depending upon capability of the image editor's capabilities. A clipping path is a closed vector path or shape that is used to cut out a two-dimension image in image editing software application products or services so that all information inside the path will be included after the clipping path is applied, and information outside the clipping path will be omitted from the output.

Another example of graphics states or parameters includes the alpha constant that supports graphics transparency for combining an image with a background to create the appearance of partial or full transparency. An example of electronic document is a Portable Document Format (PDF) document or any other types or formats of electronic documents that include the aforementioned properties, characteristics, or attributes.

In various embodiments, these techniques described herein identify sensitive data to be protected from one or more electronic documents. Some embodiments process the sensitive data to reduce the need for available space as well as the utilization of computational resources during the application of steganography techniques. These embodiments may also partition the sensitive data into a plurality of smaller segments were a segment may contain one or more bits, one or more bytes, one or more characters, etc.

The sensitive data may therefore be processed on a bit-by-bit, byte-by-byte, character-by-character basis, or on any other suitable basis. The available spaces in these one or more electronic documents may then be identified. One or more segments of the sensitive data may then be concealed in an available space; and the plurality segments of the sensitive data may be separately concealed and thus protected in at least one of these available spaces. The display attribute of a segment of the sensitive data in an available space may be set to non-displayable (e.g., zero-width) so as not to disturb the original appearance of the available space in the electronic document.

A steganography map may be generated to store the pertinent steganography information. For example, a steganography map may store therein how a piece of sensitive data is concealed in an electronic document and how to restore the concealed sensitive data. It shall be noted that the term "steg" is used as a verb or noun to indicate the application of steganography techniques to a piece of electronic data. The steganography map may be further protected with cryptography techniques. For example, a steganography map may be further encrypted with an asymmetric encryption scheme using both a pair of a public key and a private key in some embodiments or with a symmetric encryption scheme or any other suitable encryption schemes with a fixed or variable strength (e.g., 40-bit cipher, 128-bit cipher, 256-bit cipher, 512-bit cipher, etc.)

A recipient of an electronic document protected by steganography techniques and a steganography map may first decrypt the steganography map using the corresponding decryption scheme; and the step map is then used to unscramble or restore the concealed sensitive data. In some embodiments where the sensitive data is saved as a separate file (with or without other data), this separate file may be similarly concealed among the available spaces of the electronic document. Some embodiments may also embed, hide, or assemble a step map or the information therein with the processed electronic document so that a recipient of the processed electronic document needs the correct decryption scheme(s) to first decrypt the ciphertext of the steganography map into the original steganography map.

The original location of the sensitive data in the electronic document may be processed in a variety of different ways. For example, the original location of the sensitive data may be masked with a mask or filter in some embodiments so that the electronic document appears to be blank at the location of the sensitive data. In some other embodiments, the sensitive data at the original location of may be replaced with some invalid or illegal (collectively invalid) data that conforms to all the attributes of the sensitive data with the only exception that the information thereof is invalid or illegal so that the electronic document appears to be normal to reduce the chance of perception, detection, or attraction hinting that certain data may be concealed.

To avoid detection by statistical methods and hence subsequent, unauthorized cracking or unscrambling of the concealed sensitive data, the line width of a line including at least one available space in which one or more segments of the sensitive data are concealed may be modified upon the insertion of the one or more segments of the sensitive data so that the total line width of the same line remains the same before and after the application of steganography techniques to conceal the one or more segments.

One of the advantages of these techniques described herein is that various embodiments described here rely upon not only cryptography techniques, which may be subject to various attacks, but also steganography techniques that not only conceal sensitive data but also reduce the possibility of perception, detection, and hence unauthorized unscrambling of the protected data. When combining the steganography techniques and the cryptography techniques for the steganography maps, the concealed data can only be restored upon the application of the authorized decryption scheme(s) as well as the authorized unscrambling scheme(s).

Another advantage of these techniques described herein is that these electronic documents, the contents thereof, as well as sensitive data therein may be pre-processed as described later to reduce the computational resource utilization (e.g., processor cycles, memory footprint, etc.) during the application of the steganography and/or cryptography techniques in some embodiments. That is, these embodiments not only improve the security of electronic data or information but also improve the efficiencies of computing systems.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1A illustrates a high level block diagram of a system for protecting data in an electronic document, form, file, message, or data segment (collectively an "electronic document" for singular or "electronic documents" for plural) using steganography techniques in one or more embodiments. In these embodiments, the system for protecting data from one or more electronic documents may include a computing system 102 that locally includes a software application 110 and a plurality of steg modules 112. The computing system 102 includes a user interface (UI) 104 that provides an interface between a user and the software application 110. In some other embodiments, a software application 110 and/or a plurality of steg modules 112 may reside on a remote computing system 108 that is operatively connected to the computing system 102 via a computer network (e.g., Internet, intranet, etc.)

The computing system 102 and the computing system 108 (if available) may access a storage device 114 that may reside locally or remotely providing access to various electronic documents, templates, profiles, libraries, etc. In operation, the computing system 102 may identify some sensitive data from one or more electronic documents 102 (e.g., an Internal Revenue Service Form 1040) as inputs. For example, a user (e.g., a tax payer) may enter his or her social security number via the user interface 104 into an instance of the software application 110.

The computing system 102 may invoke one or more of the plurality of steg modules 112 to conceal the true social security number of the user in at least one of the one or more electronic documents 102 and generate one or more processed electronic documents (e.g., 116, 118, 120, 122, etc.) that conceals the true social security number As described above, a processed electronic document may further replace the true social security number in its original location with a blank field (e.g., 122) or as an illegal or invalid number that conforms to the attributes of the true social security number (e.g., 116 and 118). Alternatively, the entire line include the preexisting text "SSN" or "Social Security Number" may be blanked (e.g., 120) to reduce the perception, detection, and unscrambling of the concealed, true social security number.

Figure 1B:
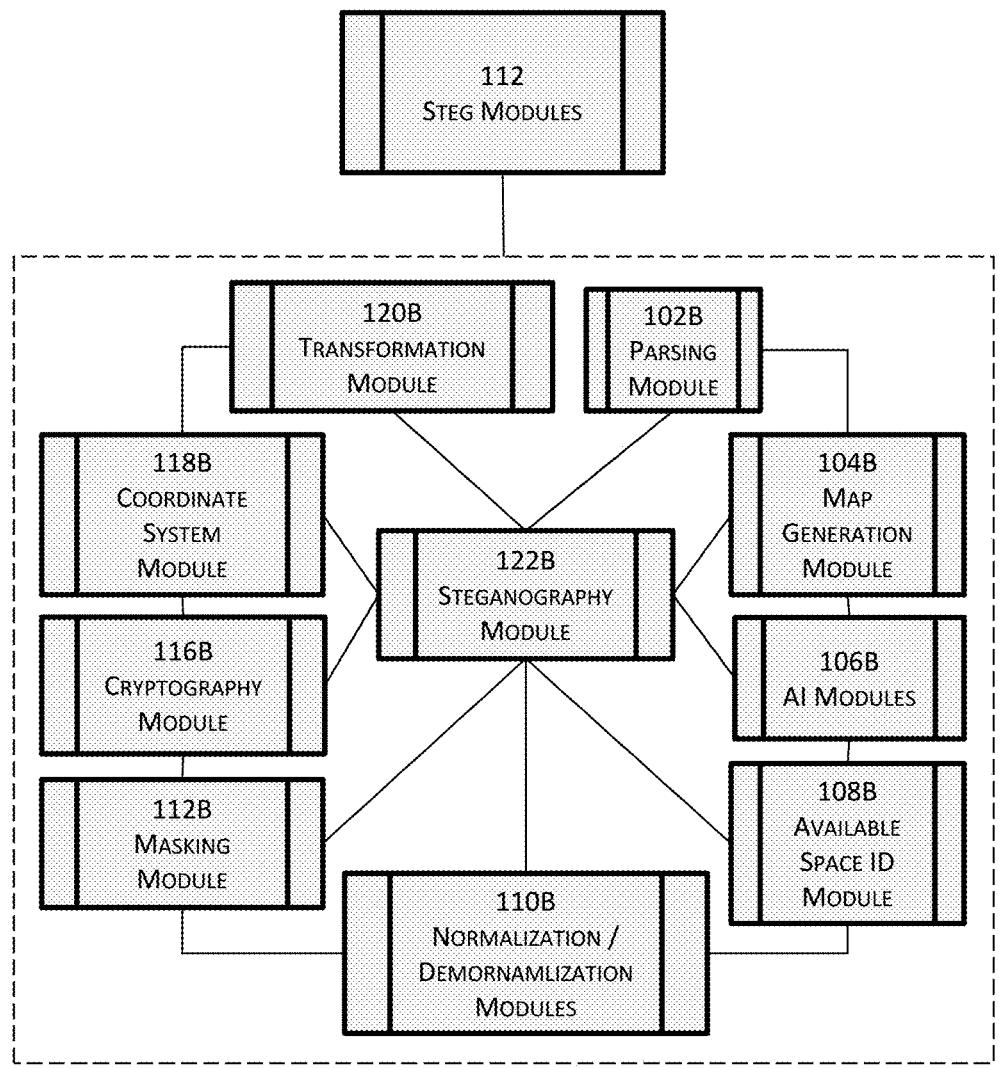
FIG. 1B illustrates more details about the steg modules in FIG. 1A of a system for protecting data in an electronic document, form, file, message, or data segment using steganography techniques in one or more embodiments.

FIG. 1B illustrates more details about the steg modules in FIG. 1A of a system for protecting data in an electronic document, form, file, message, or data segment using steganography techniques in one or more embodiments. In these embodiments, the plurality of steg modules 112 may include a parsing module 102B that is configured to parse the contents of an electronic document, and/or a map generation or update module 104B that is configured to generate or update a steganography map.

The plurality of steg modules 112 may also include one or more artificial intelligence (AI) modules 106B that are configured to perform various artificial intelligence tasks including, for example, natural language processing on various input text. Natural language processing may include, for example, lexicon analyses, syntax analyses, semantics analyses, context analyses, natural language understanding, natural language word sense disambiguation, natural language names recognition, word, sentence, paragraph, and/or topic segmentation, extraction of relations among text, recognition of colloquialism, slangism, and/or jargons, fuzzy string match, etc.

The plurality of steg modules 112 may also include an available space identification module 108B that is configured to identify available spaces in an electronic document. An available space includes a space in an electronic document that can be used for concealing at least a segment (e.g., one or more bits, one or more bytes, one or more characters, etc.) of sensitive data to be protected. An available space may include any space at any location of an electronic document that does not alter the appearance of the electronic document even when a segment of sensitive data, after some processing as described below, is concealed within it.

Examples of available spaces may include, for example, non-breaking white spaces (e.g., Hexadecimal representation "A0", narrow no-break space (U+202F defined in Unicode), figure space (U+2007 defined in Unicode, etc.), word joiner (U+2060 defined in Unicode), tabs, etc. The width attribute of an available space may be set to zero (zero-width non-breaking white space) in some embodiments so that any number of segments can be concealed between two characters defining the available space although the size of the electronic document may increase. In some other embodiments, a normal white space may be modified into an A0 white space to encode "1"; and a normal white space may be used to encode "0" so that the size of the electronic document remains unchanged although this latter approach, when compared to the former, provides less available space for concealing sensitive data.

The plurality of steg modules 112 may also include a normalization (or de-normalization) module 1106 that is configured to process the contents of an electronic document or data to transform an input to a transformed input for subsequent processing. For example, a social security number XXX-XX-XXXX may be transformed into XXXXXXXXX by ridding the dashes; or texts of different font typefaces, sizes, size ranges, and/or colors may be transformed into the same typeface, size, and/or color. The normalization module 1106 may also normalize the line widths of an electronic document (or a portion thereof) to the same line width across the entire electronic document by, for example, using one or more TJ operator values to compensate for changes in line widths in some embodiments where a PDF (portable document format) is to be used. In some other embodiments, the normalization module 1106 may adjust one or more TJ operator values so that the line widths of a plurality of lines in an electronic document or a portion thereof remain substantially identical (e.g., with variation in line widths smaller than a predetermined threshold limit).

The plurality of steg modules 112 may also include a masking or filtering module 112B that masks or filters out a portion of an electronic document to prevent the portion from further processing. One or more cryptography modules 116B may also be included in the plurality of steg modules 112 to encrypt and/or decrypt data with symmetric and/or asymmetric schemes. The plurality of steg modules 112 may also include a coordinate system 118B that defines a device-independent, platform-independent coordinate system for an electronic document generated by various techniques described herein. The coordinate system thus defined may include an origin that may be fixed at, for example, a corner or vertex (e.g., the upper right-hand corner, the lower left-hand corner, etc.) of a document. The coordinate system may also provide one or more units of measure to precise locate various elements (e.g., text, objects, images, etc.) in an electronic document. A unit of measure may be defined in a device-independent and platform-independent manner. For example, a unit of measure may be defined to be of the same size and one point (1/72 inch) of a typeface. A unit of measure may also be defined as a fixed number of pixels or any other suitable units.

The plurality of steg modules 112 may also include 1106 may also include one or more transformation modules 120B that are configured to transform data (e.g., default information in an electronic document) in a first format into a second format. The steganography module 122B in the plurality of steg modules 112 is configured to apply steganography techniques to a piece of sensitive data to conceal the sensitive data in an electronic document. More details about the steganography module 122B as well some other modules are described below. A module described herein may be implemented purely as a software implementation, hardware circuitry such as application specific integrated circuits (ASICs), or a combination of software and hardware.

Figure 1C:
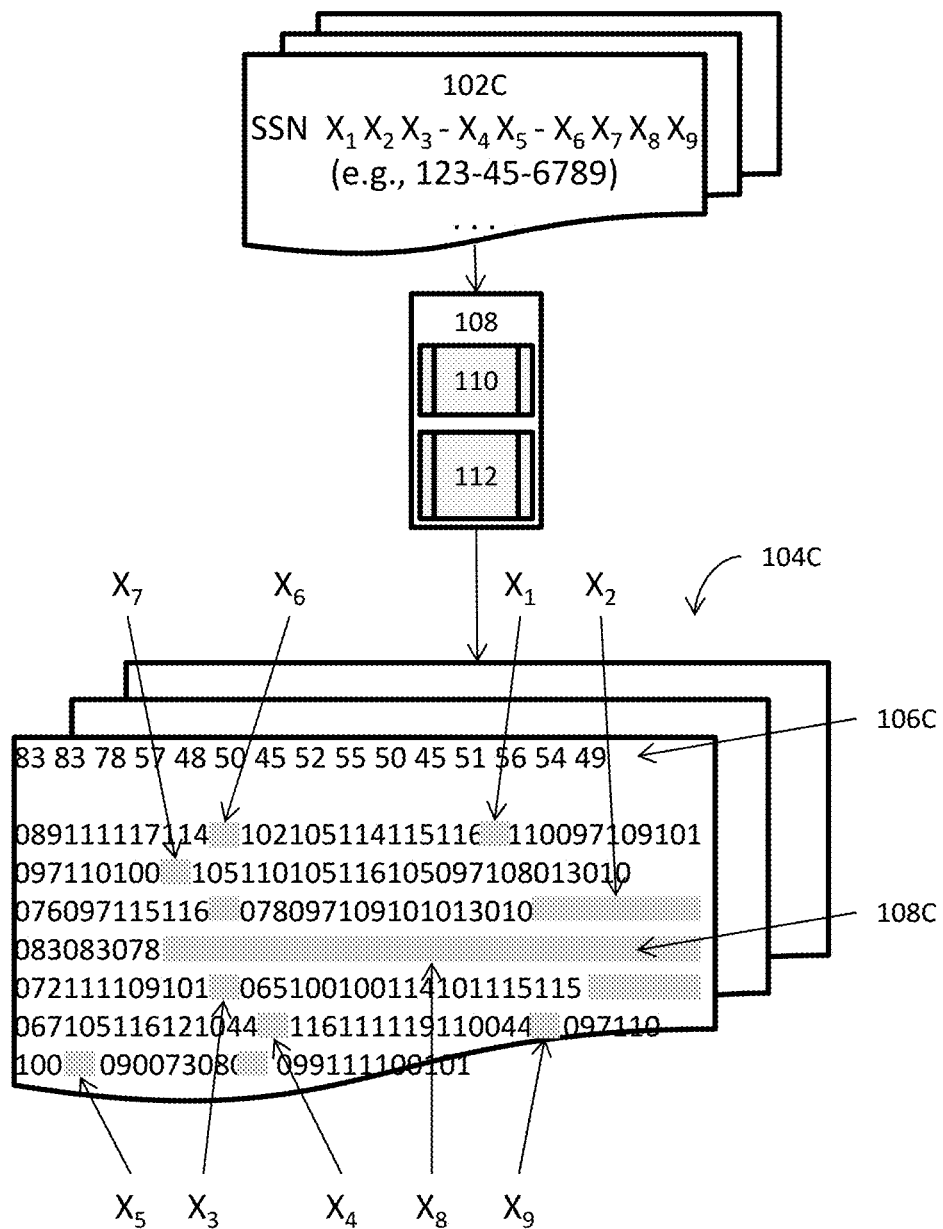
FIG. 1C illustrates an example of protecting data in an electronic document, form, file, message, or data segment using steganography techniques in one or more embodiments.

FIG. 1C illustrates an example of protecting data in an electronic document, form, file, message, or data segment using steganography techniques in one or more embodiments. In this example, an original electronic document 102C may include sensitive data that is the target for steganography. Such sensitive data, as illustrated in FIG. 1C, may include a social security number $X_1X_2\,X_3$-$X_4X_5$-$X_6X_7X_8X_9$ (e.g., 123-45-6789). After the performance of one or more modules in the plurality of steg modules 112, a plurality of available spaces (the shaded rectangular spaces 108C) may be identified from the electronic documents 102C.

Some embodiments then transform the original electronic document 102C into the transformed electronic document 104C where the original social security number (e.g., 123-45-6789) is dissected into a plurality of segments that are separately concealed in some of the identified white spaces 108C. In this example, the social security number (123-45-6789) may be first normalized into a normalized form to rid the dashes "-" to reduce the memory space requirement to accommodate the social security number for further processing. The normalized security number (123456789) is then dissected into nine segments each contain one character. These nine segments are then concealed into a plurality of white spaces according to a predetermined or a random pattern, as illustrated in FIG. 1C.

Instructions for how to restore the concealed sensitive data into the original sensitive data may be recorded in, for example, a steganography map. For example, associations between the locations or references to the locations of the white spaces and the respective segments concealed therein may be recorded in a steganography map. In some other embodiments where a scrambling pattern or algorithm is used in concealing sensitive data in an electronic document, the steganography map may also store the scrambling pattern or unscrambling algorithm that may be subsequently used to reconstruct or restore the concealed data into original sensitive data.

In addition to concealing the original, true social security number, an invalid or illegal social security number 106C may be shown in place of the true social security number in the original location of the document. In the example illustrated in FIG. 1C, an invalid or illegal social security number 902-472-3861 (corresponding to the ASCII code 83 83 78 57 48 50 45 52 55 50 45 51 56 54 49) is shown in place of the original, true social security number to lower the probability or possibility of perception, detection, and thus unauthorized revealing of the true social security number (e.g., the absence of a social security number might draw attention or suspicion that the sensitive data is concealed elsewhere).

Figure 2A:
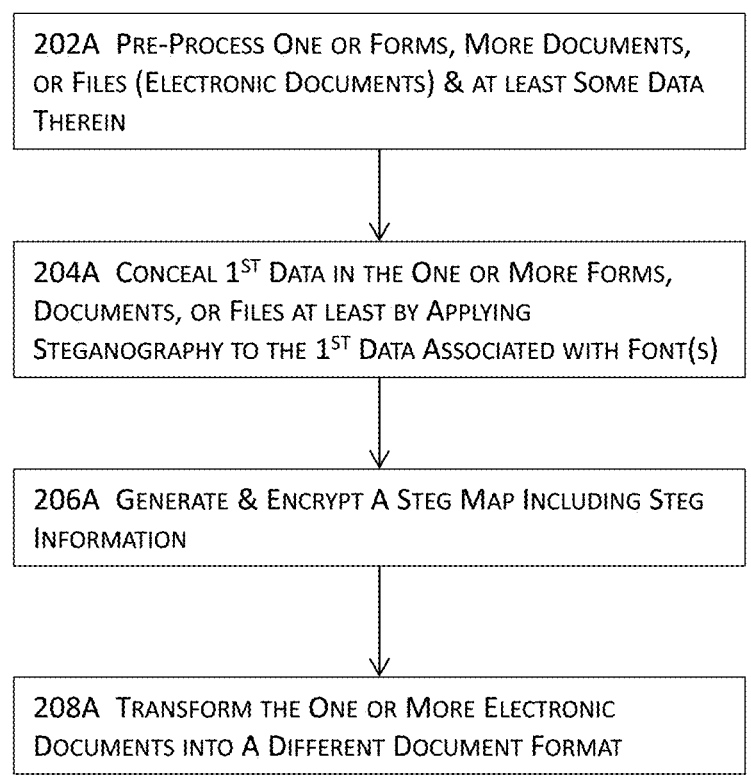
FIG. 2A illustrates a high level block diagram of a process or a system for protecting data in an electronic document, form, file, message, or data segment using steganography techniques in one or more embodiments.

FIG. 2A illustrates a high level block diagram of a process or a system for protecting data in an electronic document, form, file, message, or data segment using steganography techniques in one or more embodiments. In these embodiments, one or more electronic documents or at least some data therein may be pre-processed at 202A. One of the objectives of pre-processing the one or more electronic documents or at least some data therein is to reduce the computational resources utilization in subsequent processing such as the performance of steganography techniques. More details about pre-processing one or more electronic documents or at least some data therein are described below with reference to FIG. 3A.

First data to be protected may be concealed in the one or more electronic documents at 204A at least by applying steganography to the first data. Steganography is different from cryptography in that cryptography involves systematic encoding of information into ciphertext that can be decrypted or decoded later with the proper key(s). Cryptography may include, for example, symmetric key cryptography, public-key cryptography, and hash functions. Symmetric key cryptography involves encryption methods where both the sender and the receiver share the same key used to encrypt the data. In Public-key cryptography, two different but mathematically related keys are used. Hash functions does not use a key, instead they compute a fixed length hash value from the data. Furthermore, one may easily detect that an electronic document is encrypted due to one's inability to access the encrypted document.

On the other hand, steganography conceals sensitive data in such a way to reduce, minimize, or eliminate perception or detection of the existence of such sensitive data unless the concealed sensitive data is properly unscrambled. As a result, steganography includes composing hidden sensitive data so that only the sender and the recipient know that the sensitive data even exists, whereas in cryptography the existence of the encrypted message is visible to the world. Some embodiments described herein utilize steganography techniques, while some other embodiments utilize both steganography and cryptography. More details about applying steganography are described below with reference to FIGS. 3D-3E.

A steganography map may be generated at 206A to store information pertaining to the application of steganography techniques to the first data in some embodiments. A steganography map may be further encrypted with any appropriate cryptography techniques to strengthen the protection and to increase the difficulty of any unauthorized attempts to reveal the sensitive data. More details about generating a steganography map are described below with reference to FIGS. 3F-3G.

The one or more electronic documents may be transformed into one or more transformed electronic documents in a different document format at 208A. In some embodiments, multiple electronic documents may be transformed into a single transformed electronic document with the first data concealed within the single transformed electronic document (e.g., a single PDF document with sensitive data such as the first data concealed therein). In some embodiments, these one or more transformed electronic documents may further include one or more steganography maps that include at least the information about applying steganography techniques to the first data.

It shall be noted that these flow diagrams in FIGS. 2-3 may be implemented as software modules, hardware modules, or any combinations of software modules and hardware elements. For example, any portion of the flow diagrams in FIGS. 2-3 may be implemented as application specific integrated circuits (ASICs), a portion of firmware, etc. as hardware modules in some embodiments. In some other embodiments, any portion of the flow diagrams in FIGS. 2-3 may be coded into algorithms in one or more programming languages as one or more software modules; and a software module may be compiled into a sequence of instructions that may be further loaded into a volatile memory (e.g., random access memory) for execution at one or more microprocessors. Of course, the flow diagrams illustrated in FIGS. 2-3 may be implemented as a combination of hardware elements and software modules in some other embodiments.

Figure 2B:
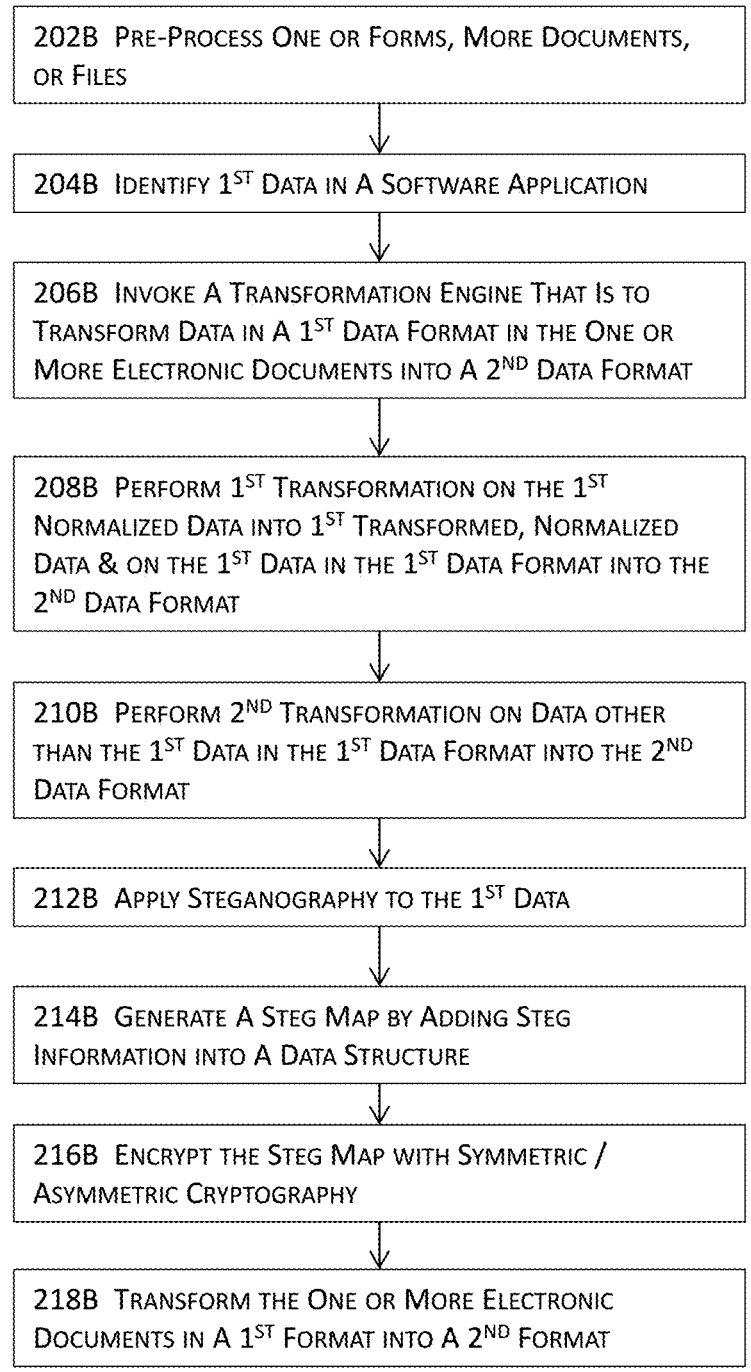
FIG. 2B illustrates a more detailed block diagram of a process or a system for protecting data in an electronic document, form, file, message, or data segment using steganography techniques in one or more embodiments.

FIG. 2B illustrates a more detailed block diagram of a process or a system for protecting data in an electronic document, form, file, message, or data segment using steganography techniques in one or more embodiments. In these embodiments, one or more electronic documents or at least some data therein may be pre-processed at 202B. As described above, one objective of pre-processing the one or more electronic documents or at least some data therein is to reduce the computational resources utilization in subsequent processing such as the performance of steganography techniques. More details about pre-processing one or more electronic documents or at least some data therein are described below with reference to FIG. 3A.

The first data in a software application may be identified at 204B. The first data may be a piece of sensitive data that is a target for protection and concealment. One or more transformation modules (e.g., 120B in FIG. 1B) may be invoked or executed at 206B. These one or more transformation modules are configured to transform data in a first data format (e.g., the 7-bit ASCII or American Standard Code for Information Interchange) into a second data format (e.g., a binary format).

A first transformation may be applied to the first data at 208B to transform the first data into the first transformed data. In some embodiments where the first data has been normalized into the first normalized data, the first transformation may be applied to the first normalized data to transform the first normalized data into the first transformed, normalized data.

At 210B, a second transformation may be performed to transform additional data in the first data format other than the first data into the second data format. This additional data may be related to the first data in that the additional data may be correlated with the first data for financial, criminal, medical, or any other types of identity theft or for other illegal purposes, although this additional data by itself may not be necessarily of particular interest or value. For example, the name of a user may not be in and of itself any particular value or interest and may even be a public piece of information.

Nonetheless, when the name of the user is combined with the social security number, this combined information may be the ultimate target for various types of identity theft. In this example, either one of the name of a user and the social security number of the user by itself may not be as useful to accomplish any illegal purposes. Nonetheless, this is no longer true when the name and the social security number of a user are obtained. Other additional data such as those that may be used to derive the relation between the first data and a specific identity of a user may also be the target of transformation at 210B.

Steganography techniques may be applied to the first data and optionally to the additional data at 212B. More details about applying steganography techniques to data are described below with reference to FIGS. 3D-3E.

A steganography map may be generated or updated at 214B by storing information about the application of steganography techniques to various pieces of data. More details about steganography maps are described below with reference to FIGS. 3F-3G.

The step map may be further processed with cryptography techniques at 216B. For example, a steganography map may be encrypted with a symmetric key encryption scheme, a public key encryption scheme, or hashing. The one or more electronic documents in a first format may then be transformed into a second format at 218B while concealing the sensitive data therein. For example, one or more tax forms in a proprietary format of an electronic tax preparation software product or service may be transformed into a PDF format or other suitable format for transmission over computer networks.

Figure 3A:
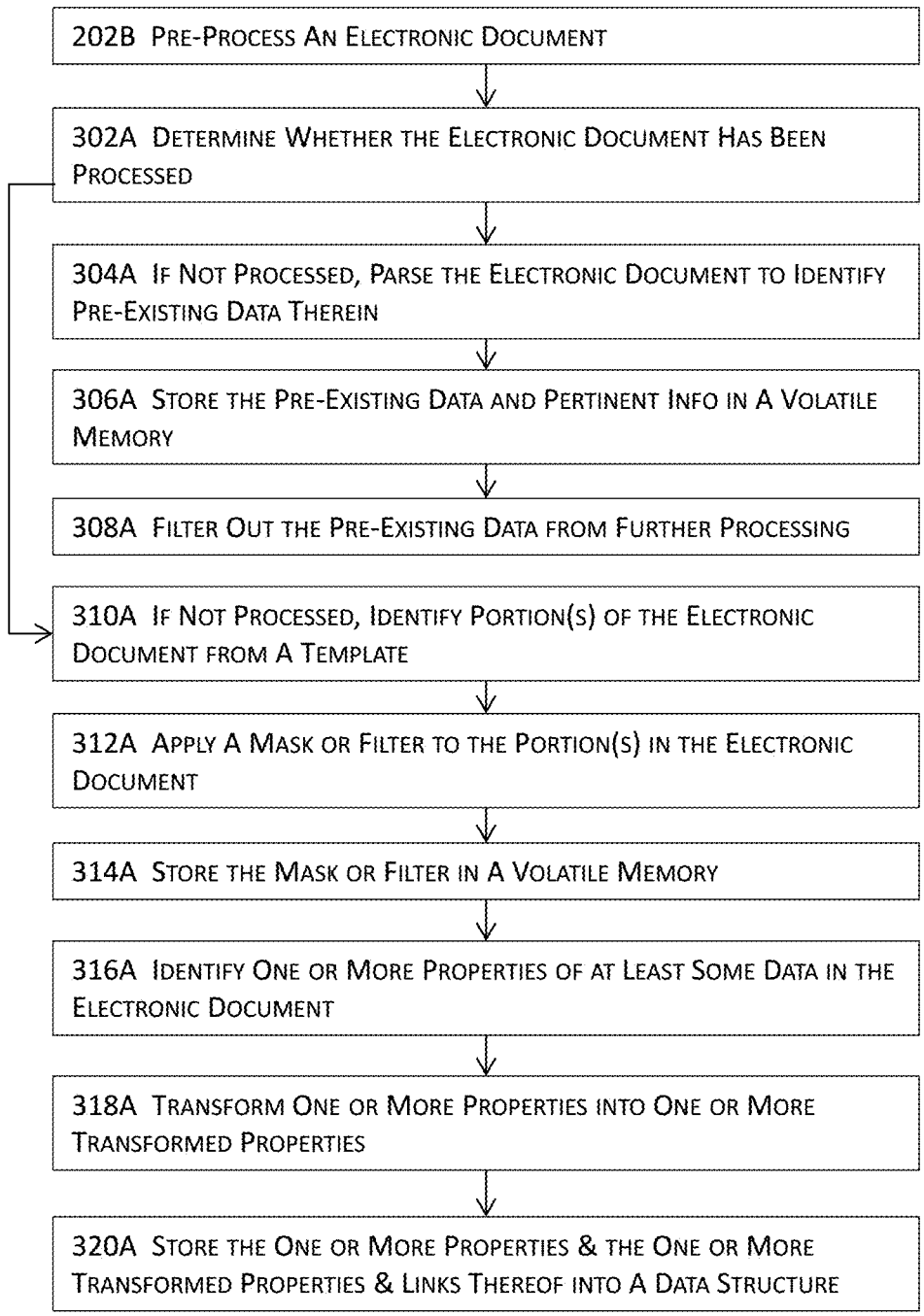
FIG. 3A illustrates more details about a portion of FIG. 2B for a process or a system for protecting data in an electronic document, form, file, message, or data segment using steganography techniques in one or more embodiments.

FIG. 3A illustrates more details about a portion of FIG. 2B for a process or a system for protecting data in an electronic document, form, file, message, or data segment using steganography techniques in one or more embodiments. More specifically, FIG. 3A illustrates more details about pre-processing an electronic document. In these embodiments, an electronic document may be first identified; and a determination may be made to determine whether the electronic document has already been processed at 302A. In some embodiments, processed electronic documents or references thereof may be stored in a data structure that can be looked up to determine whether an identified electronic document has already been processed.

If it is determined that the electronic document has not been processed at 302A, a parsing module (e.g., 102B) may parse the electronic document at 304A to identify pre-existing data therein. For example, a standard tax form or a portion thereof reproduced in a screen view of an electronic tax preparation and filing application may be parsed to identify the pre-existing, default contents therein at 302A. In some embodiments, the pre-existing contents may even include some user provided data. In some embodiments, the parsing module may not necessarily identify the contents of the identified electronic document. Rather, the parsing module may merely identify the real estate or portions occupied by pre-existing data in the electronic document at 310A. Either way, the term "pre-existing data" may include both the identified contents and the identified real estate in the electronic document.

The pre-existing data may be stored at 306A in a non-transitory computer readable storage medium such as a volatile memory. In addition, the pre-processed document or a reference thereto may be stored in, for example, a data structure so that the same electronic document needs to be pre-processed only once. This identified pre-existing data may be filtered out from subsequent processing at 308A for better utilization of computational resources because most, if not all, of the pre-existing data may not be targets for protection and thus may not merit allocation of as much computational resources or any at all.

When the parsing module identifies portions or real estate containing contents of the electronic document at 310A, a mask or filter may be applied at 312A to mask or filter out these portions or the real estate from further processing for better utilization of computational resources. These portions may be identified as the real estate occupied by or corresponding to existing data in the electronic document, without knowing what the existing data is or include in some embodiments. That is, a portion in an electronic document may be identified so long as the portion is occupied by certain data, whereas what the certain data actually includes (e.g., what characters are in the certain data) needs not be determined. The mask or filter and/or the corresponding data (e.g., the masked or filtered out portions or real estate) may also be store at 314A in a non-transitory computer readable storage medium such as a non-volatile memory (e.g., random access memory).

One or more properties of at least some data in the electronic document may be identified at 316A. In some embodiments where the at least some data comprise user provided data that is or may be the target for steganography, these one or more properties may be transformed at 318A into one or more transformed properties. For example, these one or more properties may pertain to properties of the font(s) in the electronic document such as the typefaces, sizes, size ranges (e.g., dynamic size ranges), colors, etc. These one or more properties may be transformed into one or more corresponding properties. For example, multiple typefaces (or sizes, size ranges, colors, etc.) may be transformed into one or more typefaces (or sizes, size ranges, colors, etc.) that conform to various requirements of the target format or of the requirements by various authorities concerning the electronic document.

In some embodiments where the at least some data comprise user provided data that is or may be the target for steganography, these one or more properties may be transformed into one or more simplified properties based in part or in whole upon one or more rules. For example, a rule may govern that multiple typefaces be transformed into a single typeface. In addition, another rule may require multiple sizes be transformed into a single size of a smaller font size that is specified in the rule and requires less available space to conceal. Similarly, another rule may control that dynamic size ranges in an electronic document may be transformed into a fixed, smaller font size that is also specified in this rule and requires less available space to conceal. Yet another rule may further require that different font colors be transformed into a single font color. One of the advantage and objective of this transformation based at least in part on one or more rules at 318A is to simplify the at least some data and/or reduce its size for easier and more efficient subsequent processing such as concealment in one or more available spaces of an electronic document.

These one or more properties and optionally the one or more transformed properties may be stored at 320A in a data structure. In some embodiments, links or associations between the one or more properties and the one or more corresponding transformed properties may also be stored in the data structure so that the at least some data may be eventually restored to its original format(s).

Figure 3B:
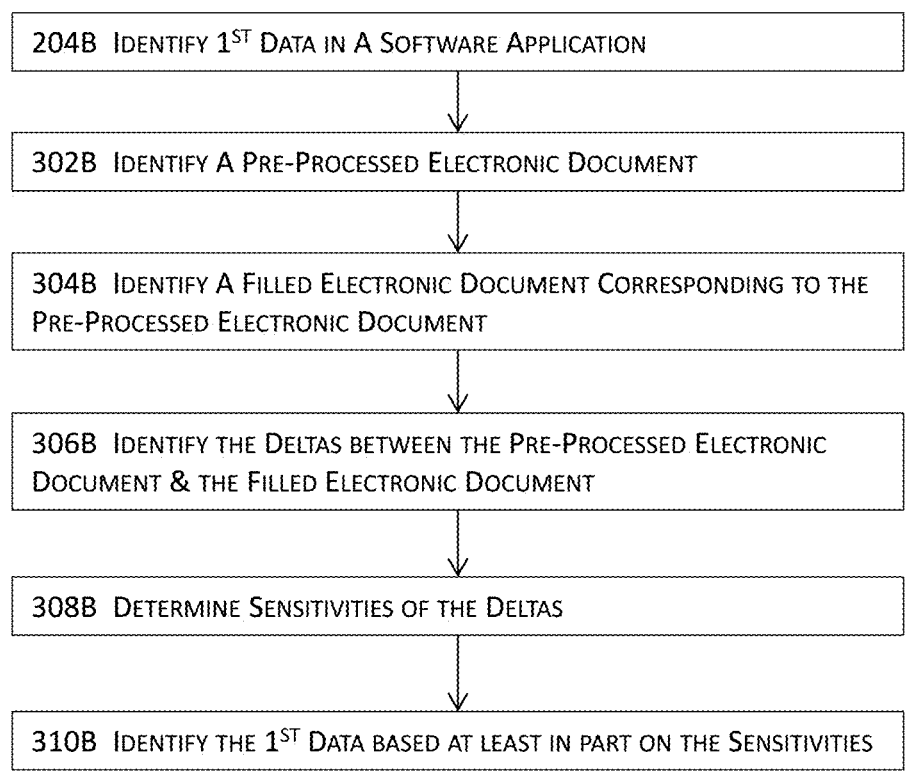
FIG. 3B illustrates more details about another portion of FIG. 2B for a process or a system for protecting data in an electronic document, form, file, message, or data segment using steganography techniques in one or more embodiments.

FIG. 3B illustrates more details about another portion of FIG. 2B for a process or a system for protecting data in an electronic document, form, file, message, or data segment using steganography techniques in one or more embodiments. More specifically, FIG. 3B illustrates more details about the identification of the first data that is or may be the target for steganography. In these embodiments, the pre-processed electronic document may be identified at 302B. In some embodiments, a filled version of the electronic document may be identified at 304B, and the deltas between the original electronic document and the filled version of the electronic document may be identified at 306B by comparing the original electronic document and the filled version of the electronic document.

Respective sensitivity values of the deltas may be determined at 308B by using, for example, heuristics or artificial intelligence modules that perform processes including natural language processing, name recognition, etc. to determine the sensitivities of the deltas. A sensitivity value may indicate how sensitive a piece of data or information is and may include a numeric value, a percentage value, a textual indicator (e.g., high, medium, low), a graphic indicator (e.g., red, orange, yellow, green, etc.), or any other suitable format to indicate whether a the piece of data or information may be a potential target or an actual target for steganography. In addition to sensitivity values, an artificial intelligence module may further determine the confidence interval or significance level for each sensitivity value to statistically or probabilistically indicate the accuracy of the sensitivity value.

The first data may be identified at 310B based in part or in whole upon the sensitivity value of the deltas. In some embodiments, a threshold sensitivity value may be determined so that information or data associated with sensitivity values above the threshold sensitivity value may be identified as the first data. Certain information or data such as the information or data whose sensitivity values cannot be deterministically determined, information or data associated with relatively low confidence intervals, or randomly sampled information or data, etc. may be forwarded for domain expert review. The results of the domain expert review may be used to construct training sets to retrain the artificial intelligence modules to produce more accurate results.

Figure 3C:
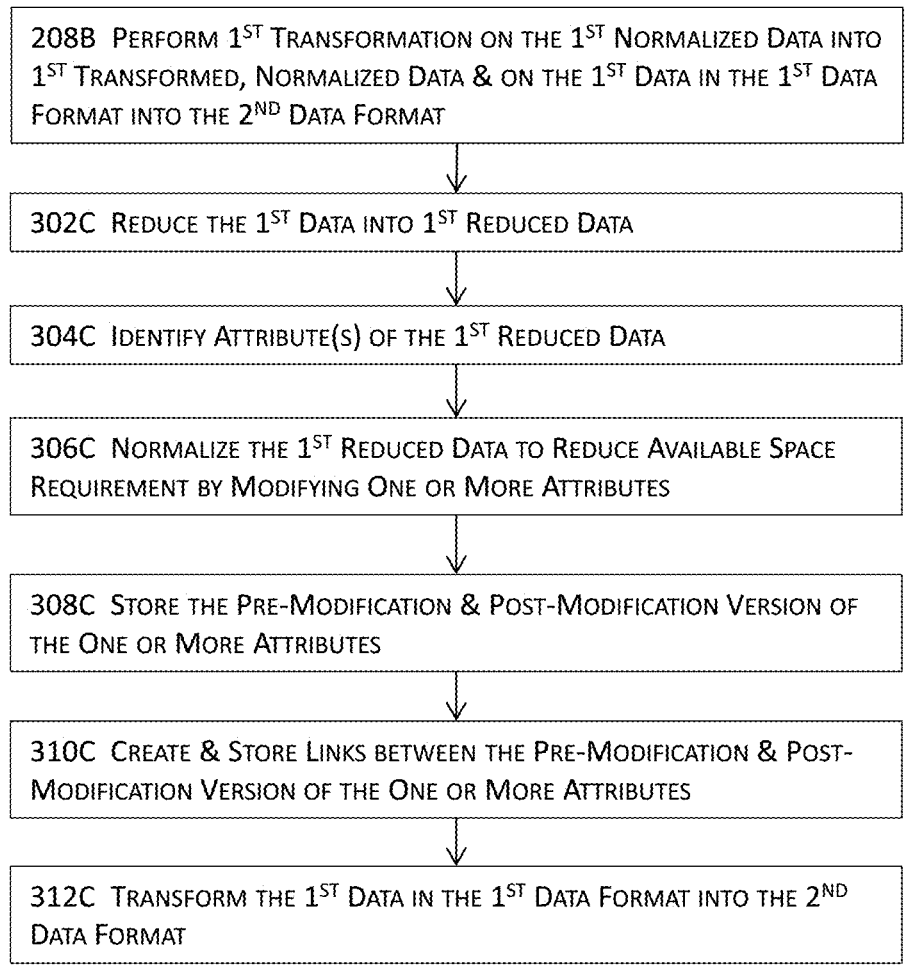
FIG. 3C illustrates more details about another portion of FIG. 2B for a process or a system for protecting data in an electronic document, form, file, message, or data segment using steganography techniques in one or more embodiments.

FIG. 3C illustrates more details about another portion of FIG. 2B for a process or a system for protecting data in an electronic document, form, file, message, or data segment using steganography techniques in one or more embodiments. More specifically, FIG. 3C illustrates more details about performing a first transformation on data to transform the data from a first format to a second format. The first data may first be optionally reduced to the first reduced data at 302C. This data reduction at 302C may include, for example, ridding a part of the first data that is not relevant to the subsequent processing of the first data or is not worth protection. For example, the dashes "-" in a social security number may be removed at 302C.

One or more attributes of the first data or the first reduced data may be identified at 304C; and the first reduced data may be normalized at 306C at least by modifying these one or more attributes to reduce the size of available space for concealing the first data or the first reduced data. For example, the font size of the first data (or the first reduced data) may be reduced to a smaller font size in order to reduce the available space required to conceal the first data (or the first reduced data). In addition or in the alternative, attributes such as font colors, font sizes, font dynamic ranges, etc. may also be subject to modification.

The values before and/or after the modification of these one or more attributes may be stored at 308C. In some embodiments, a link between a pre- and a post-modification attribute may be optionally created at 310C. One of the purposes of storing these post- and/or pre-modification values and/or storing the links is to ensure that the first data can be restored upon successful decryption and unscrambling. The first data may be transformed from a first data format into a second data format at 312C based at least in part upon the one or more modified attributes.

Figure 3D:
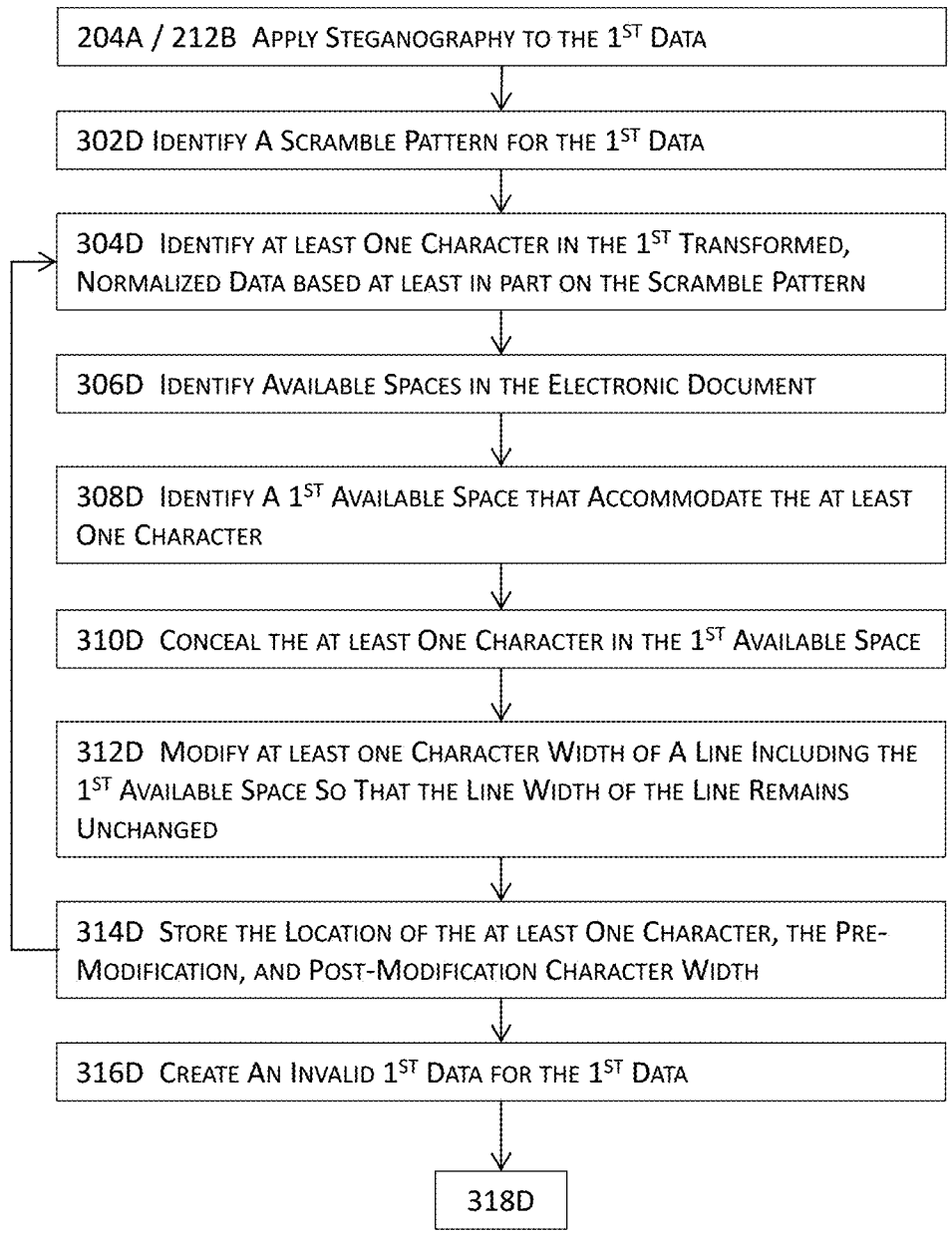
FIGS. 3D-3E jointly illustrate more details about another portion of FIG. 2B for a process or a system for protecting data in an electronic document, form, file, message, or data segment using steganography techniques in one or more embodiments.
Figure 3E:
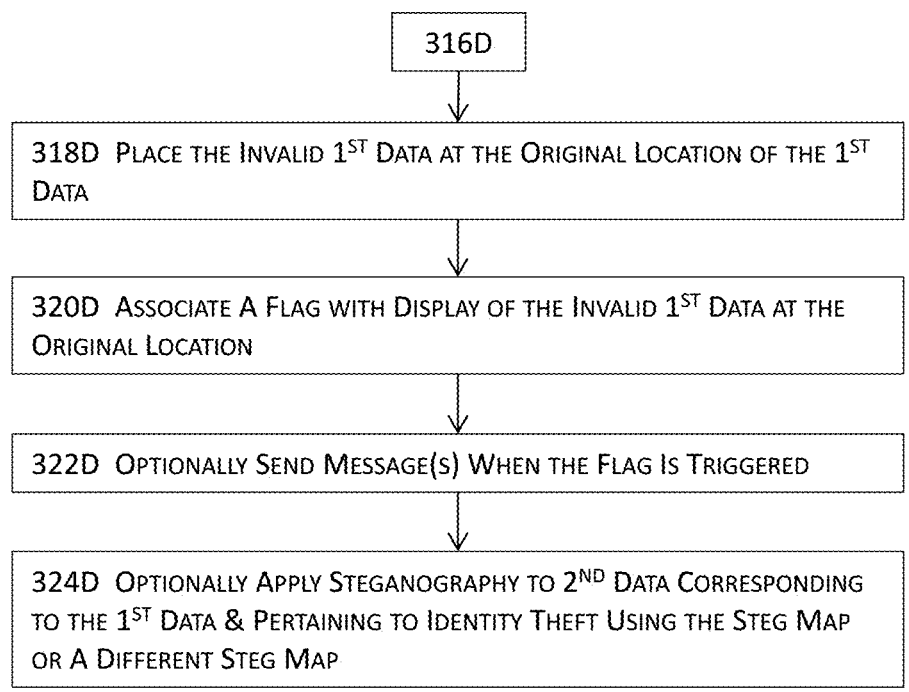

FIGS. 3D-3E jointly illustrate more details about another portion of FIG. 2B for a process or a system for protecting data in an electronic document, form, file, message, or data segment using steganography techniques in one or more embodiments. More specifically, these figures illustrate more details about applying steganography to the first data. In some embodiments, a scramble pattern may be optionally identified for the first data at 302D. The scramble pattern may be used to determine an order in which the plurality of segments of the first data (e.g., a plurality of characters, a plurality of segments of one or more bits, one or more bytes, or one or more other units) is to be processed. A pattern may include a fixed pattern in some embodiments or a random pattern in some other embodiments.

In some embodiments, a scramble pattern may also determine another order in which a plurality of available spaces in an electronic document is to be used to conceal the plurality of segments of the first data. In some other embodiments, a scramble pattern may store a mapping between the plurality of segments of the first data and the plurality of available spaces that are used to conceal the plurality of segments, in addition to or in the alternative of the aforementioned data or information stored therein.

As described above, the first data may be partitioned into a plurality of segments, where each segment may include one or more bits, one or more bytes, one or more characters, or one or more other units of measure. For the ease of description, FIGS. 3D-3E will now be described where the first data includes textual information that is dissected into a plurality of characters. At least one character in the first data, the first normalized data, or the first transformed, normalized data (collectively first data hereinafter) may be identified based in part or in whole upon the scramble pattern at 304D. A plurality of available spaces (e.g., A0 non-breaking spaces) may be identified in the electronic document at 306D; and a first available space that accommodate the at least one character may be identified at 308D.

The at least one character may then be concealed within the first available space at 310D. To reduce or eliminate the perception and detection of concealed data and hence subsequent unauthorized attacks with, for example, statistical methods, the line width of a line that includes the first white space for the at least one character may be maintained at its original line width or at a unified line width at 312D. For example, at least one character attribute of the line that includes the first white space may be modified at 312D so that the line width remains unchanged after concealing the at least one character of the first data in the first available space.

For example, the character width for display may be set to zero-width or some other value to accommodate the insertion of the at least one character in the first available space. In some embodiments where PDF is the target format for the electronic document, the TJ operator values may be adjusted for the line or distributed among multiple lines (e.g., the line plus one or more adjacent lines) to distribute the difference in the width of the line due to the insertion of the at least one character. In some embodiments, the character width of the at least one character in the first available space may be set to zero-width or some other width values to eliminate or reduce the variation in the width of the line including the first white space.

The location or a reference thereof for the at least one character, the location or a reference thereof for the first white space, the pre-modification attribute value, the post-modification attribute value, the adjustments to the TJ operators, or any other information pertaining to concealing the at least one character in the first white space may be stored at 314D in, for example, a step map. This stored information may be used to restore the at least one character that has been concealed in the first white space. The process may return to identify the next character and repeat the sub-processes 304D through 314D until the first data is entirely processed.

An invalid or illegal first data may be optionally created at 316D for the first data. One of the objectives of an invalid or illegal first data is to replace the true first data in its location in the electronic document so as to reduce suspicion, perception, or detection of concealed data. For example, a completely filled tax form with a blank field for the social security number may more likely arouse suspicion that the social security number may be concealed and thus may draw more attention or even unauthorized attacks trying to reveal the concealed data. Invalid or illegal first data may include data that does not exist, data that does not fall within the valid range of data, or data that was once valid or legal but is now invalid or illegal, etc. For example, social security numbers do not start with "9" or "666" so some examples of an invalid or illegal social security numbers may include 9XX-XX-XXXX or 666-XX-XXXX. The invalid or illegal first data may be placed at the original location of the first data at 318D.

In some embodiments, a flag may be associated with the invalid or illegal first data at the original location of the first data at 320D. The flag may be set to trigger a warning upon, for example, the display of the illegal or invalid first data in the electronic document, a failed attempt to decrypt or unscramble any documents described herein, etc. For example, a failed attempt to decrypt the steganography map or a failed attempt to unscramble the concealed first data may trigger the warning. One or more messages may be optionally sent at 322D to the original user, various authorities, etc. when the flag is triggered at 320D.

In addition to applying steganography to the first data that has been identified as sensitive for protection, steganography may also be applied to second data corresponding to the first data at 324D using a substantially similar or identical approach as that described above for the first data. This second data may be related to the first data in that the second data may be correlated with the first data or may be used to derive the correlation between the first data and the identify of a user for financial, criminal, medical, or any other types of identity theft or for other illegal purposes, although this second data in and of itself may not necessarily be of particular interest or value.

In the description of FIG. 2B, an example of such second data includes the name of a user. The name of a user may even be public information. Nonetheless, when combined with the social security number, this combination may be one of the ultimate goals for identity theft. Another example of such second data may include an address which may not arouse sufficient interest for identity thieves. Nonetheless, an address may be used to derive, via other information sources, the name of the user (or a limited number of names) and in turn correlate a social security number with such name(s). Steganography may also apply to these types of second data although these types of data may not necessarily arouse sufficient interest from unauthorized accesses.

Figure 3F:
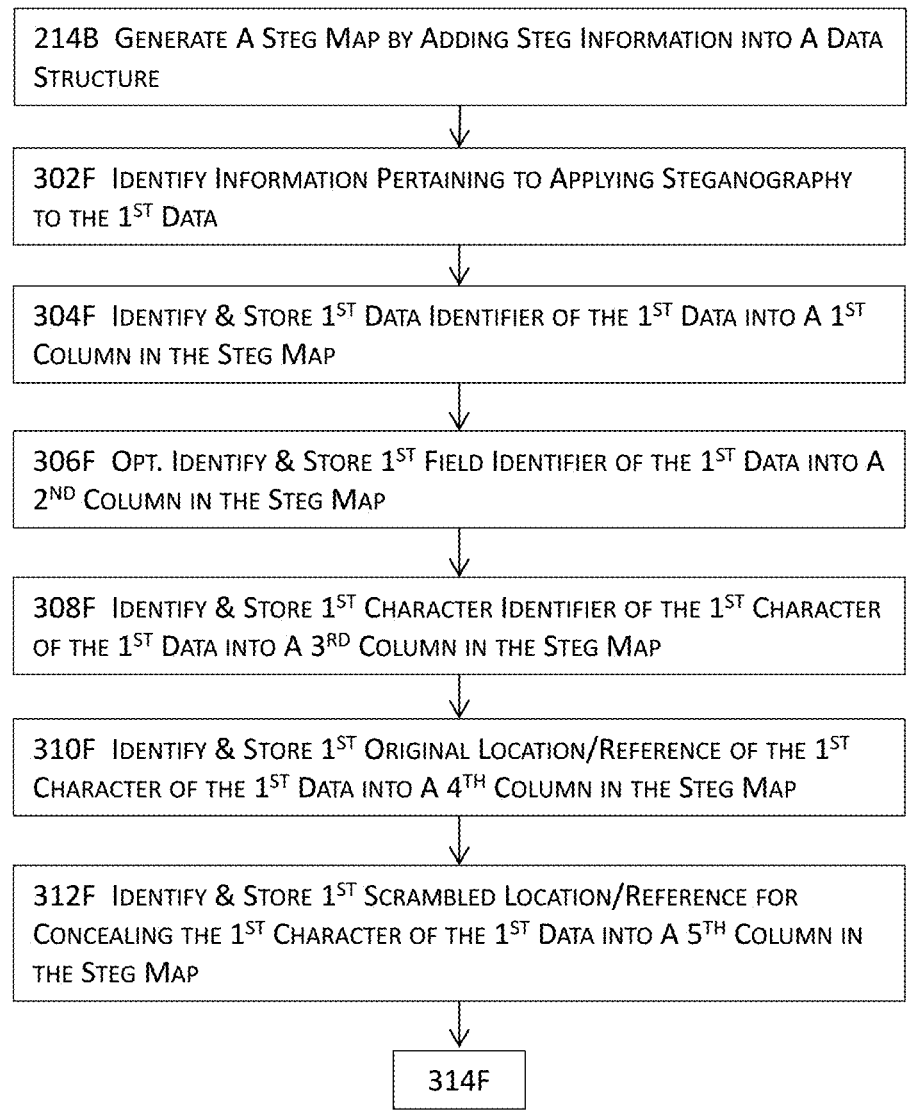
FIGS. 3F-3G jointly illustrate more details about another portion of FIG. 2B for a process or a system for protecting data in an electronic document, form, file, message, or data segment using steganography techniques in one or more embodiments.
Figure 3G:
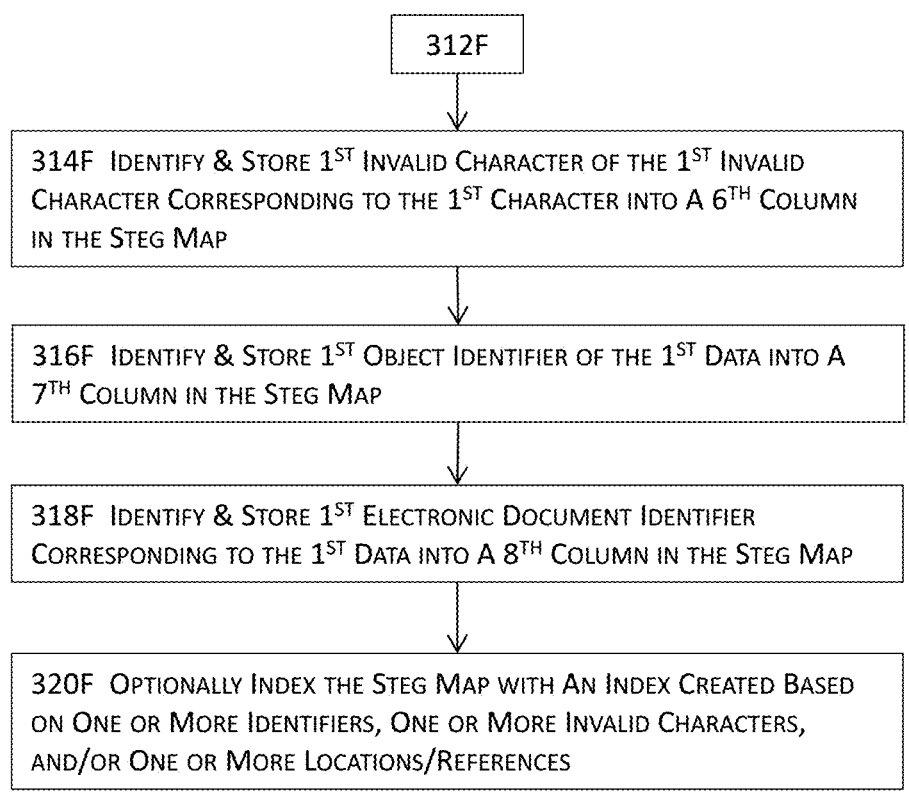
Figure 31:
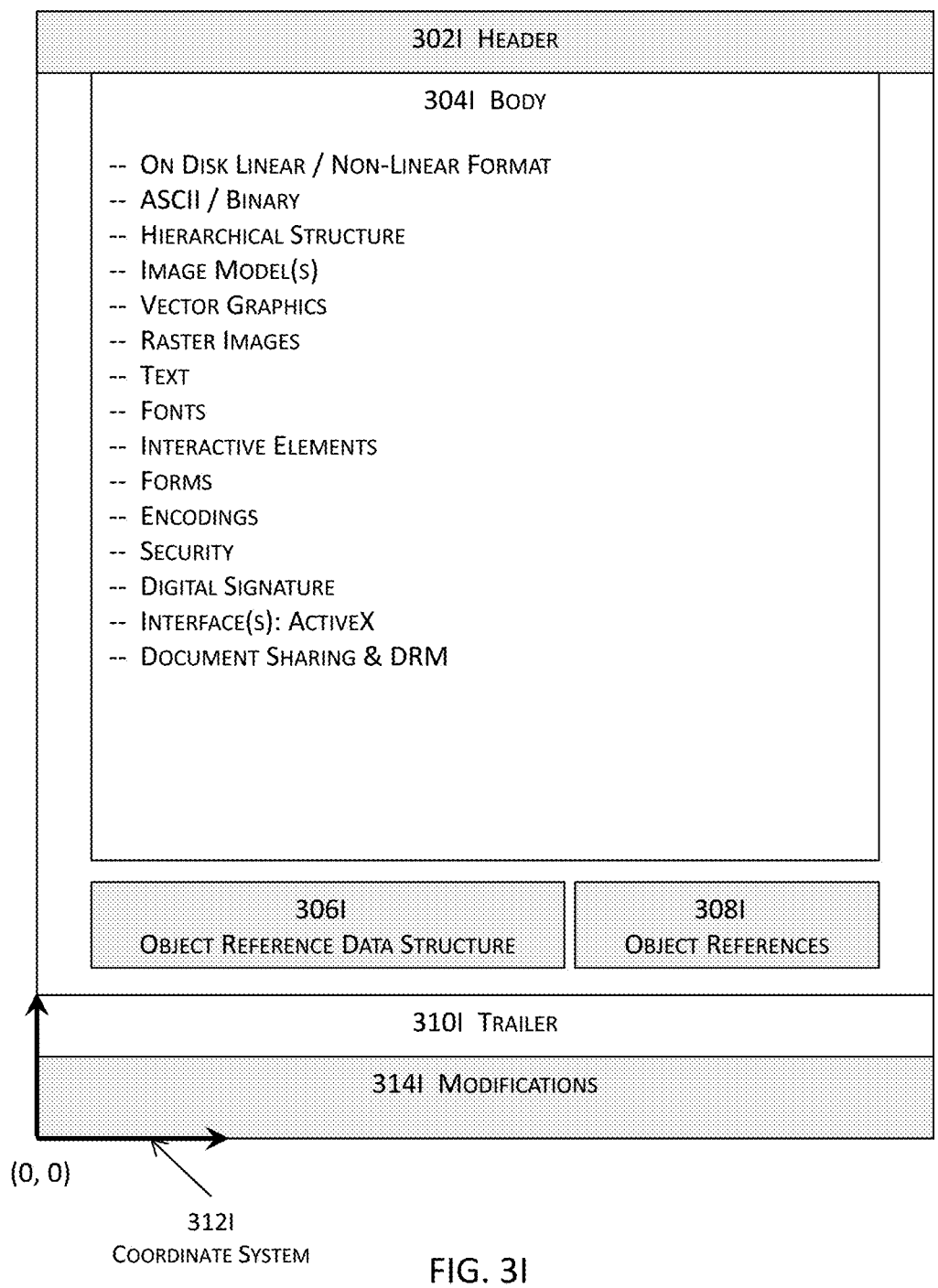

FIGS. 3F-3G jointly illustrate more details about another portion of FIG. 2B for a process or a system for protecting data in an electronic document, form, file, message, or data segment using steganography techniques in one or more embodiments. More specifically, these figures illustrate more details about generating or updating a steganography map. As described above, a steganography map is used to restore concealed data and thus includes at least the information needed to restore concealed data. These embodiments illustrated in FIGS. 3F-3G merely present some examples of such information or data although other information or data may also be stored in a steganography map.

In these embodiments, information pertaining to applying steganography to the first data may be identified at 302F. A first data identifier of the first data (or a variant thereof) may be identified and stored into the step map at 304F. For example, the first data identifier may be stored into a first column in the steganography map at 304F. It shall be noted that a first column is merely a column in the step map having a table structure but does not correspond to any specific column. In addition, it shall be noted a steg may have other structures than a tabular structure, and that a tabular structure is described herein for the ease of description and illustration.

A first field identifier of the first data (or a variant thereof) may be optionally identified and stored into the step map at 306F. For example, the first field identifier may be stored into a second column in the steganography map at 304F. A first character identifier of a first character in the first data (or a variant thereof) may be identified and stored into the step map at 308F. For example, the first character identifier may be stored into a third column in the steganography map at 308F. It is self-explanatory that the first data may include multiple characters and may thus correspond to multiple columns for character identifiers.

A first original location or a reference thereof for the first character of the first data (or a variant thereof) may be identified and stored into the step map at 310F. For example, the original location or a reference thereof for the first character of the first data may be stored into a fourth column in the steganography map at 310F. Similarly, a first scrambled location or a reference (e.g., a pointer) thereof for the first character of the first data (or a variant thereof) may be identified and stored into the step map at 312F. For example, the first scrambled location or reference thereof may be stored into a fifth column in the steganography map at 312F.

A first invalid character or a representation thereof (e.g., ASCII representation, binary representation, etc.) corresponding to the first character of the first data (or a variant thereof) may be optionally identified and stored into the step map at 314F. For example, the first invalid character or a representation thereof may be stored into a sixth column in the steganography map at 314F. A first object identifier or a link thereof of a first object (e.g., a stream object) corresponding to the first data (or a variant thereof) may be identified and stored into the step map at 316F. For example, the first object identifier or the link thereof may be stored into a seventh column in the steganography map at 316F.

A first electronic document identifier or a reference thereof may be identified and stored into the step map at 318F. For example, the first electronic document identifier or a reference thereof may be stored into an eighth column in the steganography map at 318F.

A steganography map may be optionally indexed at 320F by using an index to facilitate the retrieval of information or data from the steganography map. For example, a steganography map may be indexed using the locations, the references to locations, one or more identifiers, etc. as indices in some embodiments. In some other embodiments, an index may be constructed, assembled, or hashed from one or more identifiers, one or more invalid characters, and/or one or more locations or references to respective locations; and the constructed indices may be used to index a steganography map to facilitate more efficient retrieval of data or information from the steganography map. For example, the indexing process for the steganography map may sort the column values according to the corresponding indices so that when a specific object in the steganography map may be more efficiently accessed by using its corresponding index, without having to parse through the entire steganography map.

FIG. 3H illustrates a simplified example of a steganography map in one or more embodiments. More specifically, the steganography map illustrated in FIG. 3H includes some of the information described above with reference to FIGS. 3F-3G. For example, the steganography map in FIG. 3H includes a column for data identifiers, a column for field identifiers, a column for character identifiers, a column for original locations or references to original locations, a column for field scrambled locations for characters or references to scrambled locations, a column for illegal or invalid character values respectively corresponding to the legal or valid characters, and a column for the electronic document identifiers.

FIG. 3I illustrates a simplified example of a structure of an electronic document processed with the steg modules described herein in one or more embodiments. This example structure of an electronic document includes a header portion 302I, the body 304I, an object reference data structure 306I, an object references 308I, a trailer 310I, a section including modifications made to the electronic document 314I, and a coordinate system 312I. Each section in the electronic document may reference a boundary delineated by the coordinate system 312I. The header section 302I may include data or information such as version number of the electronic document, compatibility information of this electronic document (e.g., compatible versions), creator's information, metadata about the electronic document, or other suitable data, etc.

The body section 304I may include various types of information such as image models support transparency, vector graphics, raster images, text of one or more fonts, interactive elements, forms, digital signature(s), etc. In some embodiments, the body section 304I may be one or more stream objects including the contents of each page of the electronic document. The body section 304I may be structured in a variety of different manners. An electronic document described herein uses font objects each of which may include a description of a digital typeface that describes the characteristics of a typeface or may include an embedded font. These font objects may be embedded based on digital font formats such as Type 1 font format, TrueType font format, OpenType font format, substitute fonts with the same metrics, etc.

For example, the body section 304I (or even the entire electronic document) may include a linear file structure or a non-linear file structure. For example, an electronic document having a linear file structure may be written to disk in a linear (e.g., a linear page order) fashion so that the electronic document may be accessed (e.g., from a Web browser) without waiting for the entire electronic document to download. An electronic document may also be arranged in a non-linear structure so that the electronic document, when saved on disk, utilizes smaller space.

The electronic document may also be stored in a variety formats including, for example, the 7-bit ASCII format, a binary format (e.g., 8-bit binary format), etc. The structure of an electronic document may also be either flat or hierarchical. An electronic document may also invoke various functions such as digital signature function to allow the electronic document to be digitally signed with a digital signature, any tempering or alteration of which results in the destruction of the integrity and authenticity of the electronic document.

The electronic document may also include one or more interfaces for software applications to operate on the electronic document. For example, an electronic document may include an ActiveX interface that allows COM-enabled (Component Object Model) software applications to utilize certain functionalities provided by the electronic document. An electronic document described herein may also support digital rights management that controls the use, modification, distribution, and sharing of the electronic document.

The coordinate system 312I may include an origin (0, 0) that may be fixed at, for example, a corner or vertex (e.g., the upper right-hand corner, the lower left-hand corner, etc.) of a document. The coordinate system 312I may also define one or more units of measure that may be used to precise locate various elements or objects (e.g., text, objects, images, etc.) in an electronic document. A unit of measure may be defined in a device-independent and platform-independent manner. For example, a unit of measure may be defined to be of the same size and one point ($1/72$ inch) of a typeface. A unit of measure may also be defined as a fixed number of pixels or any other suitable units.

An electronic document may use text strings to represent textual information where characters may be shown using character codes that map to glyphs in a font using an encoding such as WinANSI, MacRoman, as well as other suitable encodings. The electronic document may specify a predefined encoding to use, a font's built-in encoding, or provide lookup table of differences to a predefined or built-in encoding.

The electronic document may also support compression techniques to reduce its size and may also support a redirection port monitor to redirect a printer port to the input of another software application (e.g., an electronic tax preparation and filing software product or service, a financial management software product or service, etc.) An electronic document described herein also support forms and may either save user provided data for a specific field in a form in the same form or as an external, stand-alone file. Therefore, a piece of data having sufficient sensitivity may also be stored as an external, stand-alone file; and multiple pieces of data sufficient sensitivity may be stored as one or more external, stand-alone files that may also be concealed in an identical or substantially similar manner as those described above for applying steganography to the first data.

The object reference data structure 306I in an electronic document may include information about indirect objects in the electronic document. For example, an object reference data structure 306I may include the byte offset of each indirect object from the start of the electronic document to allow efficient random access to these indirect objects, rather than in a sequential order. An example of an indirect object includes the root of the hierarchical file structure of an electronic document where the root is an indirect reference to the object reference data structure 306I that may be an object by itself, and a page is a leaf in the hierarchical structure.

The object references 308I may be stored in a data structure that stores references to various objects in an electronic document. An object reference object 308I may refer to objects by their identifications (e.g., names), by their references, or by identifications of some objects and references of some other objects. The object references may also include a font data structure that defines the width keys for character widths of one or more fonts or contains a reference to another object that defines the character widths that may be leveraged in the application of steganography. In some embodiments, in addition to data being modified the electronic document, the object reference section 308I may be updated with entries for all objects that were deleted, replaced, or modified in some embodiments. In some other embodiments, a new object reference section may be created to include these entries for all objects that were deleted, replaced, or modified.

The trailer section 310I may include information about the object references 308I or the object reference object itself. The trailer section 310I may also include information about the count of indirect objects in the object reference data structure 306I, offset(s) to the start of the object reference data structure, or other optional information, etc.

The modification section 314I may include some or all the changes made to the electronic document so that the original contents in the body section 304I are not disturbed and will be over-written by the corresponding information in the modification section 314I. In some embodiments, modifications to an electronic document may be performed in an incremental manner.

In some of these embodiments where the modifications are stored in the modification section 314I without disturbing the original contents in the body section 304I, the value of the state variable(s) of the information in the original contents in the body section 304I may be changed to invisible, while the value of the state variable(s) of the information in the modification section may be changed to visible. In some of these embodiments, the values of these state variables may be reversed—the state variable(s) of the information in the original contents is set to visible, and the state variable(s) of the information in the modification section 314I may be set to invisible to hide the information. These settings of the state variables may be changed during the unscrambling process.

Figure 4:
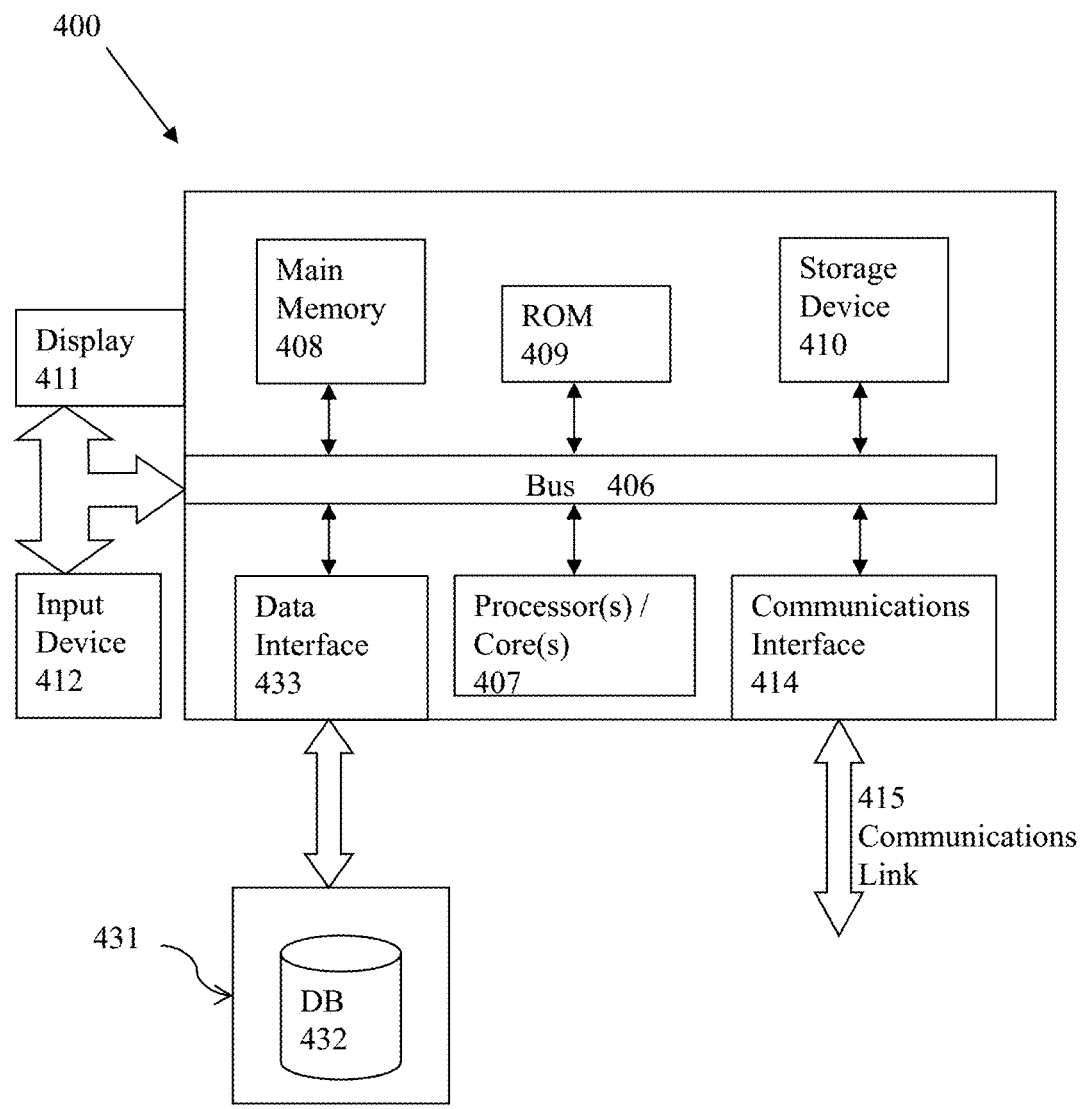
FIG. 4 illustrates a block diagram of an illustrative computing system suitable for protecting data in an electronic document, form, file, message, or data segment using steganography techniques described herein.

Referring to FIG. 4, a block diagram of components of an illustrative computing system 400 suitable for implementing various embodiments of the invention is illustrated. For example, the exemplary computing system 400 may be used to implement various processes as described in the preceding paragraphs and the figures such as various processes or modules of determining whether the first post is of interest, various analysis processes or modules, various other determining processes or modules, various processes or modules for performing various actions, etc. as described in the remainder of the Application. Computer system 400 includes a bus 406 or other communication mechanism for communicating information, which interconnects subsystems and devices, such as processor 407, system memory 408 (e.g., RAM), static storage device 909 (e.g., ROM), disk drive 410 (e.g., magnetic or optical), communication interface 414 (e.g., modem or Ethernet card), display 411 (e.g., CRT or LCD), input device 412 (e.g., keyboard), and cursor control (not shown).

According to one embodiment of the invention, computer system 400 performs specific operations by one or more processors or processor cores 407 executing one or more sequences of one or more instructions contained in system memory 408. Such instructions may be read into system memory 408 from another computer readable/usable storage medium, such as static storage device 409 or disk drive 410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. In the single embodiment or in some embodiments, the one or more processors or processor cores 407 may be used to perform various actions such as various actions, processes, or modules involving determining, analyzing, performing actions, etc. In some embodiments, at least one of the one or more processors or processor cores 407 has the multithreading capability.

In one embodiment, the term "logic" shall mean any combination of software or hardware that is used to implement all or part of the invention. In the single embodiment or in some embodiments, the one or more processors or processor cores 407 may be used to perform various acts such as various acts involving determining, analyzing, performing actions, etc. In some embodiments, at least one of the one or more processors or processor cores 407 has the multithreading capability to execute a plurality of threads to perform various tasks as described in the preceding sections.

Various actions as described in the preceding paragraphs may be performed by using one or more processors, one or more processor cores, or combination thereof 407. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 407 for execution. Such a medium may take many forms, including but not limited to, non-volatile media and volatile media. Non-volatile media includes, for example, optical or magnetic disks, such as disk drive 410. Volatile media includes dynamic memory, such as system memory 408.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 900. According to other embodiments of the invention, two or more computer systems 400 coupled by communication link 415 (e.g., LAN, PTSN, or wireless network) may perform the sequence of instructions required to practice the invention in coordination with one another.

Computer system 400 may transmit and receive messages, data, and instructions, including program, i.e., application code, through communication link 415 and communication interface 414. Received program code may be executed by processor 407 as it is received, and/or stored in disk drive 410, or other non-volatile storage for later execution. In an embodiment, the computer system 400 operates in conjunction with a data storage system 431, e.g., a data storage system 431 that contains a database 432 that is readily accessible by the computer system 400. The computer system 400 communicates with the data storage system 431 through a data interface 433. A data interface 933, which is coupled to the bus 406, transmits and receives electrical, electromagnetic or optical signals that include data streams representing various types of signal information, e.g., instructions, messages and data. In embodiments of the invention, the functions of the data interface 433 may be performed by the communication interface 414.

In the foregoing specification, embodiments have been described with reference to the figures. It will, however, be evident that various modifications and changes may be made thereto without departing from the broader spirit and scope of the invention, and that figures and examples provided are not provided to limit the scope of embodiments. Thus, the specification and drawings are, accordingly, to be regarded in an illustrative rather than restrictive sense.

It shall also be noted that although various examples described or drawings illustrated herein refer to a merchant's pairing a connected device (e.g., a cellular phone) with a wireless peripheral (e.g., a wireless transaction card reader), various aspects described apply with full and equal effects to any users who are pairing their connected devices to various types of wireless peripherals. Therefore, the reference to a merchant or a wireless transaction card reader are not intended to and shall not be interpreted as limiting the scope of the application or the scope of the claims, unless otherwise specifically recited or claimed.

Further, where methods or processes described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially. Accordingly, embodiments are intended to exemplify alternatives, modifications, and equivalents that may fall within the scope of the claims.

What is claimed is:

1. A computer implemented method for protecting data in an electronic document, form, file, message, or data segment using steganography techniques, comprising:
   at least one computer comprising a plurality of steg modules, including a transformation module, a parsing module, a map generation or update module, an available space identification module, and a cryptography module, that are stored at least partially in memory of the at least one computer, the at least one computer performing a set of acts, and the set of acts comprising:
   pre-processing at least one electronic document or at least some data in the at least one electronic document, comprising:
      determining whether the at least one electronic document has been pre-processed;
      in response to determining at least one electronic document has not been pre-processed, parsing, with the parsing module, the at least one electronic document to identify pre-existing data in the at least one electronic document;
   concealing, with at least the available space identification module, first data within the at least one electronic document at least by applying steganography to the first data that modifies one or more font attributes;
   generating or updating, with the map generation or the update module, a steganography map to include steganography information about applying steganography to the first data;
   applying, with the cryptography module, cryptography to the steganography map; and
   transforming, with the transformation module, the at least one electronic document into a different document format.

2. The computer implemented method of claim 1, pre-processing the at least one electronic document or the at least some data in the at least one electronic document further comprising:
   storing the pre-existing data and pertinent information or data; and
   filtering out the pre-existing data from further processing.

3. The computer implemented method of claim 2, pre-processing the at least one electronic document or the at least some data in the at least one electronic document further comprising:
   identifying one or more portions corresponding to or occupied by the preexisting data in the electronic document;
   applying a mask or a filter to the one or more portions in the electronic document; and
   storing the mask or the filter.

4. The computer implemented method of claim 3, pre-processing the at least one electronic document or the at least some data in the at least one electronic document comprising:
   identifying one or more properties of at least some data in the electronic document;
   transforming the one or more properties of the at least some data into one or more transformed properties; and
   storing the one or more properties, the one or more transformed properties, or one or more links between the one or more properties and the one or more transformed properties for restoring the first data to which the steganography has been applied.

5. The computer implemented method of claim 1, the set of acts further comprising identifying the first data from one or more screens of a software application, identifying the first data further comprising:
   identifying a pre-processed version of the electronic document;
   identifying a filled version of the electronic document; and
   identifying deltas between the pre-processed version and the filled version of the electronic document.

6. The computer implemented method of claim 5, identifying the first data further comprising:
   determining sensitivity values respectively corresponding to the deltas; and
   identifying the first data based in part or in whole upon the sensitivity values.

7. The computer implemented method of claim 1, the set of acts further comprising performing a first transformation on the first data or on first normalized data to generate first transformed data, performing the first transformation comprising:
   reducing the first data into first reduced data having a smaller size than a size of the first data;
   identifying one or more attributes of the first reduced data; and
   reducing a requirement for available space for the first reduced data at least by normalizing the first reduced data with modifications to the one or more attributes.

8. The computer implemented method of claim 7, performing the first transformation further comprising:
   storing a pre-modification version and a post-modification version of the one or more attributes;
   creating and storing one or more links between the pre-modification version and the post-modification version of the one or more attributes; and
   transforming the first data into the first transformed data.

9. The computer implemented method of claim 1, concealing the first data within the at least one electronic document comprising:
   identifying a scramble pattern for the first data;
   identifying at least one segment in the first data, first normalized data of the first data, or first transformed, normalized data of the first data;
   identifying a plurality of available spaces in the electronic document;
   identifying a first available space from the plurality of available spaces; and
   concealing the at least one segment in the first data in the first available space.

10. The computer implemented method of claim 9, concealing the first data within the at least one electronic document further comprising:

maintaining a width of a line including the first available space at least by modifying at least one character width of the line including the first available space; and storing a location of the at least one segment, a pre-modification value of the at least one character width, and a post-modification value of the at least one character width.

11. The computer implemented method of claim 10, concealing the first data within the at least one electronic document further comprising:

creating an invalid or illegal first data for the first data;

placing the invalid or illegal first data in an original location of the first data in the electronic document;

associating a flag with a display state of the invalid or illegal first data; and transmitting one or more warning messages when the flag is triggered to display the invalid or illegal first data.

12. The computer implemented method of claim 11, concealing the first data within the at least one electronic document further comprising:

applying the steganography to second data corresponding to the first data and pertaining to identity theft using the steganography map or a different steganography map.

13. The computer implemented method of claim 1, generating or updating the steganography map comprising:

identifying information pertaining to applying the steganography to the first data;

identifying at least two entries of a first data identifier of the first data, a first field identifier of the first data, a first character identifier of a first segment of the first data, a first original location or a first reference to the first original location of the first segment of the first data, a first scrambled location or a first scrambled reference to the first scrambled location for concealing the first segment in the electronic document, a first invalid segment for the first segment of the first data, a first object identifier of the first data, and a first electronic document identifier of the electronic document; and storing the at least two entries into respective columns of the steganography map.

14. The computer implemented method of claim 13, generating or updating the steganography map comprising:

indexing the step map with an index that is generated with one or more entries of the at least two entries in the steganography map.

15. A system for protecting data in an electronic document, form, file, message, or data segment using steganography techniques, comprising:

a memory of a computing system configured to store a sequence of instructions;

at least one microprocessor configured to execute the sequence of instructions, executions of the sequence of instructions causing the at least one microprocessor at least to pre-process at least one electronic document or at least some data in the at least one electronic document, the instructions comprising:

determining whether the at least one electronic document has been pre-processed;

in response to determining at least one electronic document has not been pre-processed, parsing the at least one electronic document to identify pre-existing data in the at least one electronic document;

one or more modules steg modules, including a transformation module, a map generation or update module, an available space identification module, and a cryptography module, stored at least partially in memory of and functioning in conjunction with at least one microprocessor of the computer and configured to conceal, with at least the available space identification module, first data within the at least one electronic document at least by applying steganography to the first data that modifies one or more font attributes;

the map generation or update module configured to generate or update a steganography map to including steganography information about applying steganography to the first data;

the cryptography module configured to apply cryptography to the steganography map; and the transformation module configured to transform the at least one electronic document into a different document format.

16. The system of claim 15, the at least one microprocessor configured to execute the sequence of instructions, the executions of the sequence of instructions that cause the at least one microprocessor to pre-process the at least one electronic document or the at least some data in the at least one electronic document further causing the at least one microprocessor to:

store the pre-existing data and pertinent information or data; and filter out the pre-existing data from further processing.

17. The system of claim 16, the at least one microprocessor configured to execute the sequence of instructions, the executions of the sequence of instructions that cause the at least one microprocessor to pre-process the at least one electronic document or the at least some data in the at least one electronic document further causing the at least one microprocessor to:

identify one or more portions corresponding to or occupied by the preexisting data in the electronic document;

apply a mask or a filter to the one or more portions in the electronic document; and store the mask or the filter.

18. The system of claim 17, the at least one microprocessor configured to execute the sequence of instructions, the executions of the sequence of instructions that cause the at least one microprocessor to pre-process the at least one electronic document or the at least some data in the at least one electronic document further causing the at least one microprocessor to:

identify one or more properties of at least some data in the electronic document;

transform the one or more properties of the at least some data into one or more transformed properties; and store the one or more properties, the one or more transformed properties, or one or more links between the one or more properties and the one or more transformed properties for restoring the first data to which the steganography has been applied.

19. The system of claim 15, the at least one microprocessor configured to execute the sequence of instructions, wherein the executions of the sequence of instructions that cause the at least one microprocessor to identify the first data from one or more screens of a software application further cause the at least one microprocessor to:

identify a pre-processed version of the electronic document;

identify a filled version of the electronic document;

identify deltas between the pre-processed version and the filled version of the electronic document;

determine sensitivity values respectively corresponding to the deltas; and identify the first data based in part or in whole upon the sensitivity values.

20. The system of claim 15, the at least one microprocessor configured to execute the sequence of instructions, wherein the executions of the sequence of instructions that cause the at least one microprocessor to perform a first transformation on the first data or on first normalized data to generate first transformed data further cause the at least one microprocessor to:
reduce the first data into first reduced data having a smaller size than a size of the first data;
identify one or more attributes of the first reduced data; and
reduce a requirement for available space for the first reduced data at least by normalizing the first reduced data with modifications to the one or more attributes.

21. The system of claim 20, the at least one microprocessor configured to execute the sequence of instructions, wherein the executions of the sequence of instructions that cause the at least one microprocessor to perform the first transformation on the first data or on first normalized data to generate first transformed data further cause the at least one microprocessor to:
store a pre-modification version and a post-modification version of the one or more attributes;
create and store one or more links between the pre-modification version and the post-modification version of the one or more attributes; and
transform the first data into the first transformed data.

22. A computer program product comprising a non-transitory machine readable storage medium having stored thereupon at least a branch management module and a release management module which, when executed by a mobile communication device, causes one or more servers to perform a set of acts for protecting data in an electronic document, form, file, message, or data segment using steganography techniques, the set of acts comprising:
at least one computer comprising a plurality of steg modules, including a transformation module, a parsing module, a map generation or update module, an available space identification module, and a cryptography module, that are stored at least partially in memory of the at least one computer, the at least one computer performing a set of acts, and the set of acts comprising:
pre-processing at least one electronic document or at least some data in the at least one electronic document, comprising:
determining whether the at least one electronic document has been pre-processed;
in response to determining at least one electronic document has not been pre-processed, parsing, with the parsing module, the at least one electronic document to identify pre-existing data in the at least one electronic document;
concealing, with at least the available space identification module, first data within the at least one electronic document at least by applying steganography to the first data that modifies one or more font attributes;
generating or updating, with the map generation or the update module, a steganography map to including steganography information about applying steganography to the first data;
applying, with the cryptography module, cryptography to the steganography map; and transforming, with the transformation module, the at least one electronic document into a different document format.

23. The computer program product of claim 22, concealing the first data within the at least one electronic document comprising:
identifying a scramble pattern for the first data;
identifying at least one segment in the first data, first normalized data of the first data, or first transformed, normalized data of the first data;
identifying a plurality of available spaces in the electronic document;
identifying a first available space from the plurality of available spaces; and
concealing the at least one segment in the first data in the first available space.

24. The computer program product of claim 23, concealing the first data within the at least one electronic document further comprising:
maintaining a width of a line including the first available space at least by modifying at least one character width of the line including the first available space; and
storing a location of the at least one segment, a pre-modification value of the at least one character width, and a post-modification value of the at least one character width.

25. The computer program product of claim 24, concealing the first data within the at least one electronic document further comprising:
creating an invalid or illegal first data for the first data;
placing the invalid or illegal first data in an original location of the first data in the electronic document;
associating a flag with a display state of the invalid or illegal first data;
transmitting one or more warning messages when the flag is triggered to display the invalid or illegal first data; and
applying the steganography to second data corresponding to the first data and pertaining to identity theft using the steganography map or a different steganography map.

26. The computer program product of claim 22, generating or updating the steganography map comprising:
identifying information pertaining to applying the steganography to the first data;
identifying at least two entries of a first data identifier of the first data, a first field identifier of the first data, a first character identifier of a first segment of the first data, a first original location or a first reference to the first original location of the first segment of the first data, a first scrambled location or a first scrambled reference to the first scrambled location for concealing the first segment in the electronic document, a first invalid segment for the first segment of the first data, a first object identifier of the first data, and a first electronic document identifier of the electronic document; and
storing the at least two entries into respective columns of the steganography map.

27. The computer program product of claim 26, generating or updating the steganography map comprising:
indexing the step map with an index that is generated with one or more entries of the at least two entries in the steganography map.

* * * * *